United States Patent
Tagawa et al.

(10) Patent No.: US 8,194,294 B2
(45) Date of Patent: Jun. 5, 2012

(54) IMAGE READING DEVICE AND IMAGE FORMING DEVICE

(75) Inventors: Hirotoshi Tagawa, Osaka (JP); Masahiro Higashitani, Osaka (JP); Katsuhiko Okamoto, Osaka (JP); Yasuyuki Horiguchi, Osaka (JP); Kei Ouchi, Osaka (JP); Sou Takahashi, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 414 days.

(21) Appl. No.: 12/468,981

(22) Filed: May 20, 2009

(65) Prior Publication Data

US 2009/0290199 A1 Nov. 26, 2009

(30) Foreign Application Priority Data

May 21, 2008 (JP) ................................. 2008-133459

(51) Int. Cl.
*H04N 1/04* (2006.01)
(52) U.S. Cl. ......... 358/475; 357/474; 357/479; 357/484
(58) Field of Classification Search .................. 358/475, 358/474, 479, 484; 362/555
See application file for complete search history.

(56) References Cited

U.S. PATENT DOCUMENTS

| | | | | |
|---|---|---|---|---|
| 5,430,289 A | * | 7/1995 | Erickson et al. | 250/205 |
| 6,469,808 B1 | * | 10/2002 | Onishi et al. | 358/475 |
| 6,661,497 B2 | * | 12/2003 | Tabata et al. | 355/69 |
| 7,349,133 B2 | * | 3/2008 | Sugeta | 358/475 |
| 7,755,811 B2 | * | 7/2010 | Herloski et al. | 358/475 |

FOREIGN PATENT DOCUMENTS

JP 2002-314760 A 10/2002

* cited by examiner

*Primary Examiner* — Houshang Safaipour
(74) *Attorney, Agent, or Firm* — Hoffmann & Baron, LLP

(57) ABSTRACT

The present invention is aimed at providing an image reading device that suppresses generation of a so-called edge shadow while suppressing uneven intensity of light emitted onto an original. A color copy machine 1 includes an illumination portion 347a that irradiates an original G with light. The illumination portion 347a includes a plurality of LEDs 501 disposed at predetermined intervals in a main scanning direction, an elliptical diffuser plate 507 that is disposed between the plurality of LEDs 501 and the original G and causes the light emitted by the plurality of LEDs 501 to diffuse, and a second reflection mirror 541B that reflects light, which is a portion of the light diffused by the elliptical diffuser plate 507 and not directly irradiated onto the original G, so as to irradiate the light onto the original G.

16 Claims, 13 Drawing Sheets

IMAGE READING DEVICE AND IMAGE FORMING DEVICE

This application is based on and claims the benefit of priority from Japanese Patent Application No. 2008-133459, filed on 21 May 2008, the content of which is incorporated herein by reference.

BACKGROUND OF THE INVENTION

1. Field of the Invention

The present invention relates to an image reading device and an image forming device including an image reading device.

2. Related Art

Conventionally, an image reading device for reading an image on an original has been known, including an illumination portion having a luminescence portion for irradiating light onto an original, a mirror for reflecting light from the original and forming a light path, an imaging lens for forming an image from a luminous flux from the original, and a CCD (charge-coupled device) for reading an image of the original formed by the imaging lens.

In addition, an image reading device that irradiates an original with light from a direction that is different from that of direct light from the luminescence portion, by means of a reflector, in order to suppress the generation of an edge shadow due to the thickness of the original in a case where light is emitted from only one direction, has also been known.

Here, a light emitting device such as an LED (light-emitting diode) has recently been used, in addition to light emitting members such as a fluorescent lamp and a xenon tube, as a luminescence portion constituting the illumination portion. For example, an image reading device is suggested in which: a plurality of light emitting devices are arranged in a main scanning direction; and an original is irradiated with light from a direction different from that of light that is directly emitted from the plurality of light emitting devices, by means of a reflector (Japanese Unexamined Patent Application Publication No. 2002-314760).

SUMMARY OF THE INVENTION

However, although the image reading device disclosed in Japanese Unexamined Patent Application Publication No. 2002-314760 can suppress generation of a so-called edge shadow, an uneven intensity distribution (uneven light intensity) may occur in a case where the illumination portion is configured by arranging the plurality of light emitting devices in the main scanning direction. This may lead to an uneven light intensity, where the intensity of light received by the CCD from portions of the same color density is not uniform. As a result, an image being read may have an uneven color density.

On the other hand, in a case where the plurality of light emitting devices are tightly arranged for suppressing uneven light intensity, the cost related to the image reading device grows.

An objective of the present invention is to provide an image reading device that suppresses generation of a so-called edge shadow by means of a reflecting member, while suppressing uneven intensity of light emitted onto an original, by disposing a diffuser plate between the original and a plurality of luminescence portions. In addition, another objective of the present invention is to provide an image forming device including the abovementioned image reading device.

The present invention relates to an image reading device containing: an illumination portion, which irradiates light onto an original, including a plurality of luminescence portions disposed at predetermined intervals in a main scanning direction, a diffuser plate that is disposed between the original and the plurality of luminescence portions and causes the light emitted by the plurality of luminescence portions to diffuse, and a reflective portion that reflects light, which is a portion of the light diffused by the diffuser plate and not directly irradiated onto the original, so as to irradiate the light onto the original; at least one mirror that forms a light path by reflecting a luminous flux from the original; an imaging lens that forms an image from the luminous flux reflected by the at least one mirror; and a reading portion that is disposed in an imaging position of the imaging lens, and reads an image of the original based on image formation by the imaging lens.

In the image reading device, the illumination portion preferably further includes a light guiding body that is disposed between the plurality of luminescence portions and the diffuser plate.

In addition, in the image reading device, the illumination portion preferably further includes a light splitting portion that is disposed between the diffusion plate and the original, and splits the light diffused by the diffusion plate into first diffused light that is directly irradiated onto the original and second diffused light that is irradiated onto the reflective portion.

Furthermore, in the image reading device, the light splitting portion is preferably configured to include a reflective member that reflects a portion of the diffused light or a bending member that bends a portion of the diffused light.

Moreover, in the image reading device, the diffuser plate is preferably an elliptical diffuser plate that diffuses the light emitted by the plurality of luminescence portions at a higher diffusion rate in the main scanning direction than in a sub-scanning direction.

In the image reading device, the diffuser plate is preferably disposed at a position at which a difference of intensity in the main scanning direction in the light from the plurality of luminescence portions is smaller than in the vicinity of a light-emitting face of the plurality of luminescence portions.

In the image reading device, the diffuser plate is preferably disposed at a position where the light from the plurality of luminescence portions is substantially uniform in the main scanning direction.

In the image reading device, each of the plurality of luminescence portions and the diffuser plate is preferably attached to an attaching member that is integrally configured in a state maintaining a positional relationship where the light from the plurality of luminescence portions is substantially uniform in the main scanning direction.

In the image reading device, the attaching member preferably has formed therein: a mounting portion that is disposed on a side to the original and mounts the diffuser plate; and an opening portion that is formed on the mounting portion so as to extend in the main scanning direction, and passes light incident on the diffusing plate therethrough.

The present invention relates to an image reading device including: an illumination portion, which irradiates light onto an original, including a plurality of luminescence portions disposed at predetermined intervals in a main scanning direction, a reflective portion that reflects light, which is a portion of the light emitted by the plurality of luminescence portions and not directly irradiated onto the original, so as to irradiate the light onto the original, and a diffuser plate that is disposed between the plurality of luminescence portions and the original and between the reflective portion and the original, and causes light directly incident from the plurality of luminescence portions, which is a portion of light emitted from the plurality of luminescence portions, and light from the reflective portion, to diffuse; at least one mirror that forms a light path by reflecting a luminous flux from the original; an imaging lens that forms an image from the luminous flux reflected by the at least one mirror; and a reading portion that is disposed in an imaging position of the imaging lens, and reads an image of the original based on image formation by the imaging lens.

Moreover, in the image reading device, the illumination portion preferably further includes a light guiding body that is disposed between the plurality of luminescence portions and the diffuser plate.

In the image reading device, the light guiding body preferably includes a first light guiding portion that guides light from the plurality of luminescence portions to a side of the original and a second light guiding portion that guides the light to a side of the reflective portion.

In addition, in the image reading device, the diffuser plate preferably includes: a first diffuser portion upon which light from the plurality of luminescence portions is incident; a second diffuser portion upon which light from the reflective portion is incident; and a non-diffusing portion that is formed between the first diffuser portion and the second diffuser portion in the sub-scanning direction, and transmits a luminous flux from the original without diffusing.

Furthermore, in the image reading device, the diffuser plate is preferably an elliptical diffuser plate that diffuses the light emitted by the plurality of luminescence portions at a higher diffusion rate in the main scanning direction than in a sub-scanning direction.

In the image reading device, the diffuser plate is preferably disposed at a position at which a difference in light intensity in the main scanning direction of light from the plurality of luminescence portions is smaller than in the vicinity of a light-emitting face of the plurality of luminescence portions.

In the image reading device, the diffuser plate is preferably disposed at a position where the light from the plurality of luminescence portions is substantially uniform in the main scanning direction.

In the image reading device, each of the plurality of luminescence portions and the diffuser plate is preferably attached to an attaching member that is integrally configured in a state maintaining a positional relationship where the light from the plurality of luminescence portions is substantially uniform in the main scanning direction.

In the image reading device, the attaching member preferably has formed therein: a mounting portion that is disposed on a side to the original and mounts the diffuser plate; and an opening portion that is formed on the mounting portion so as to extend in the main scanning direction, and passes light incident on the diffusing plate therethrough.

The present invention relates to an image forming device including: an image reading device containing an illumination portion, which irradiates light onto an original, including a plurality of luminescence portions disposed at predetermined intervals in a main scanning direction, a diffuser plate that is disposed between the original and the plurality of luminescence portions and causes the light emitted by the plurality of luminescence portions to diffuse, and a reflective portion that reflects light, which is a portion of the light diffused by the diffuser plate and not directly irradiated onto the original, so as to irradiate the light onto the original, at least one mirror that forms a light path by reflecting a luminous flux from the original, an imaging lens that forms an image from the luminous flux reflected by the at least one mirror, and a reading portion that is disposed in an imaging position of the imaging lens, and reads an image of the original based on image formation by the imaging lens; an image supporting body on which an electrostatic latent image is formed on a surface thereof based on image information relating to an image of the original that is read by the image reading device; a developing unit that develops a toner image on the electrostatic latent image formed on the image supporting body; a transfer portion that directly or indirectly transfers the toner image formed on the image supporting body to a predetermined paper; and a fixing portion that fixes the toner image transferred to the predetermined paper by the transfer portion.

According to the present invention, an image reading device can be provided that suppresses the generation of a so-called edge shadows by means of a reflective member, while suppressing uneven intensity of light emitted on an original, by disposing a diffuser plate between the original and a plurality of luminescence portions. In addition, according to the present invention, an image forming device including the abovementioned image reading device can be provided.

BRIEF DESCRIPTION OF THE DRAWINGS

FIG. 4 is a cross-sectional view illustrating a configuration of an illumination portion 347a;

FIG. 5 is a plan view illustrating a configuration of the illumination portion 347a;

FIG. 8 is a diagram illustrating a case where a light splitting portion is a triangular pole-shaped transparent member 540A having a mirror surface 540a;

DETAILED DESCRIPTION OF THE INVENTION

A preferred embodiment of the present invention is described hereinafter with reference to the drawings.

First, a first embodiment of the present invention is described with reference to FIGS. 1 to 10C.

Figure 1:
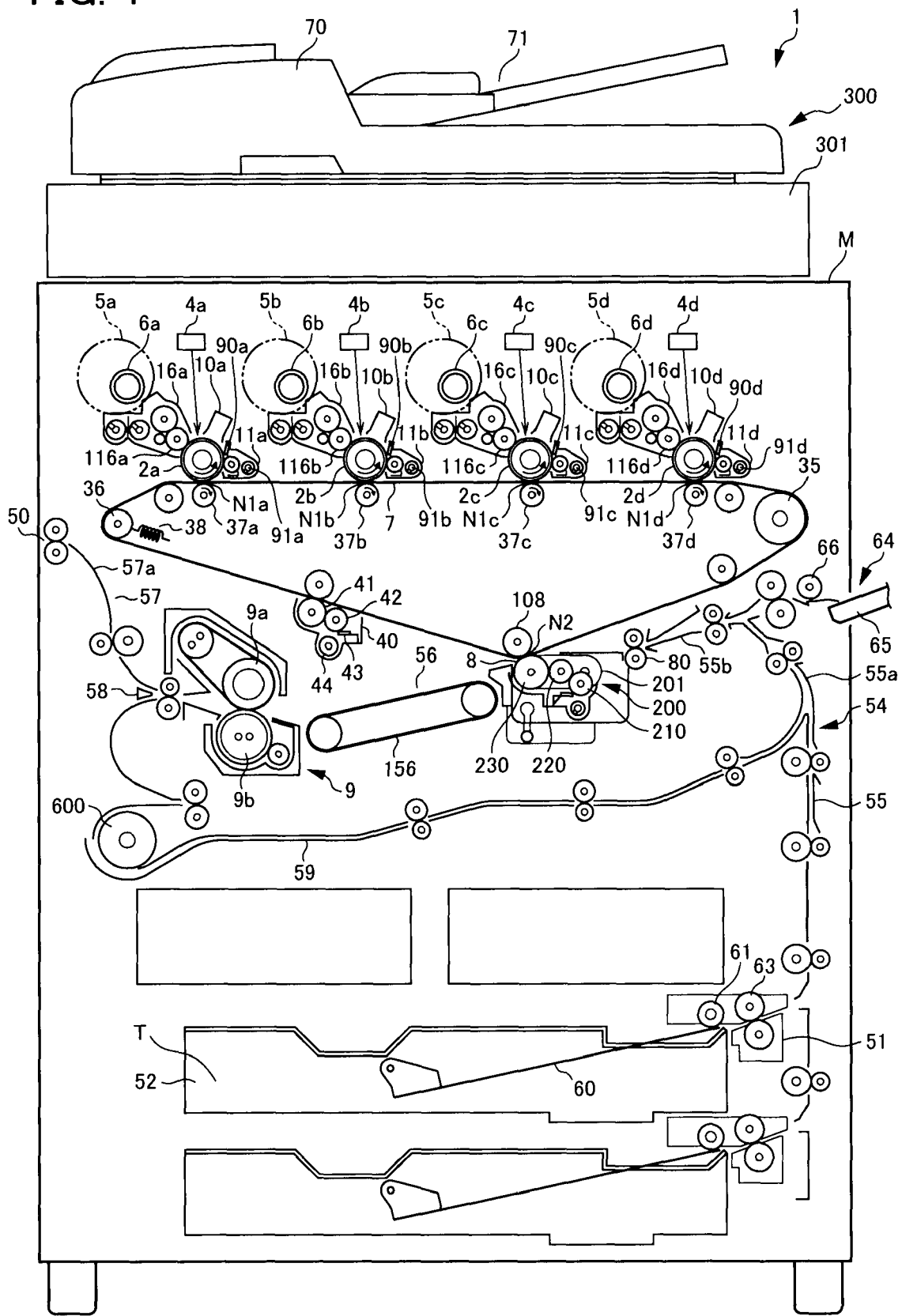
FIG. 1 is a left lateral view illustrating an arrangement of components of the color copy machine 1.

An overall structure of a color copy machine 1 as an image forming device according to the first embodiment is described referring to FIG. 1. FIG. 1 is a left lateral view showing an arrangement of components of the color copy machine 1. In the present embodiment, a side on which a manual feeding tray 65 (described later) is disposed (a right side in FIG. 1) is a front side of the color copy machine 1.

The color copy machine 1 as the image forming device includes: an image reading device 300 disposed on an upper side thereof; and a device main body M disposed on a lower side thereof that forms a toner image on a paper T on the basis of image information from the image reading device 300.

The image reading device 300 includes an original feeder portion 70 for feeding a predetermined original G (see FIG. 2), and a reader portion 301 for reading an image of the original G. The original feeder portion 70 is connected with the reader portion 301 by means of a connecting portion (not shown) so as to be openable and closable. The original feeder portion 70 also protects a reading surface 302A (see FIG. 3).

In a case where the original feeder portion 70 is closed, the original G is placed on an original support portion 71 provided on an upper face of the original feeder portion 70. The original G placed on the original support portion 71 is fed by a feeding roller (not shown) to a first reading surface 303A (see FIG. 3) constituting the reading surface 302A in the reader portion 301. In this case, an illumination unit 347 and a mirror unit 349 (see FIG. 3), described later, are fixed to a first position 303 (see FIG. 3). Then, the original G is slid through the first reading surface 303A. This allows a CCD 358 (see FIG. 3), as an image reader portion, to read an image on a surface of the original G.

In a case where the original feeder portion 70 is opened, the original G is placed on a second reading surface 304A (see FIG. 3) constituting the reading surface 302A. In this case, the illumination unit 347 and the mirror unit 349 are placed in a second position 304 (see FIG. 3) and moved in a sub-scanning direction X within the second position 304. The illumination unit 347 and the mirror unit 349 are moved while maintaining a constant length of a light path H described later (see FIG. 3) (light path length). As a result, an image of the original G placed on the second reading surface 304A is read. The reader portion 301 of the image reading device 300 is described later in detail.

The device main body M includes: photoreceptor drums 2a, 2b, 2c, and 2d as image supporting bodies; charging portions 10a, 10b, 10c, and 10d; laser scanner units 4a, 4b, 4c, and 4d; developing units 16a, 16b, 16c, and 16d; toner cartridges 5a, 5b, 5c, and 5d; toner feeding devices 6a, 6b, 6c, and 6d; an intermediate transfer belt 7; primary transfer rollers 37a, 37b, 37c, and 37d; an intermediate transfer unit 200 including a secondary transfer roller 8; and a fixing device 9. The device main body M further includes a paper feeding cassette 52 disposed to be slidable on a lower side of the device main body M, in which the paper T is housed in a state of being stacked. In addition, the device main body M includes a paper path 54 on which the paper T dispatched from the paper feeding cassette 52 is conveyed.

The photoreceptor drums 2a, 2b, 2c, and 2d are cylindrically shaped members. The photoreceptor drums 2a, 2b, 2c, and 2d are disposed in a rotatable manner on an axis that is vertical with respect to a paper surface of FIG. 1. An electrostatic latent image is formed on a surface of each of the photoreceptor drums 2a, 2b, 2c, and 2d.

The charging portions 10a, 10b, 10c, and 10d are disposed vertically above the photoreceptor drums 2a, 2b, 2c, and 2d.

The charging portions 10a, 10b, 10c, and 10d uniformly positively charge (straight polarity) the surface of the photoreceptor drums 2a, 2b, 2c, and 2d, respectively.

The laser scanner units 4a, 4b, 4c, and 4d are disposed vertically above the photoreceptor drums 2a, 2b, 2c, and 2d respectively, spaced apart therefrom. The laser scanner units 4a, 4b, 4c, and 4d are configured each including a laser light source, a polygon mirror, a polygon mirror driving motor and the like, which are not shown.

The laser scanner units 4a, 4b, 4c, and 4d scan and expose the surface of the photoreceptor drums 2a, 2b, 2c, and 2d respectively, based on image information read by the reader portion 301. By being scanned and exposed by the laser scanner units 4a, 4b, 4c, and 4d, an electric charge charged onto the surface of the photoreceptor drums 2a, 2b, 2c, and 2d is removed respectively. In this way, an electrostatic latent image is formed on a surface of each of the photoreceptor drums 2a, 2b, 2c, and 2d.

The developing units 16a, 16b, 16c, and 16d are disposed beside the photoreceptor drums 2a, 2b, 2c, and 2d (on the left side of FIG. 1). The developing units 16a, 16b, 16c, and 16d each develop a toner image of each color on the electrostatic latent image formed on the photoreceptor drums 2a, 2b, 2c, and 2d. The developing units 16a, 16b, 16c, and 16d correspond to the four toner colors of yellow, cyan, magenta, and black. The developing units 16a, 16b, 16c, and 16d are configured to include developing rollers 116a, 116b, 116c, and 1116d that can be disposed facing the photoreceptor drums 2a, 2b, 2c, and 2d, and stirring rollers for stirring toners, respectively.

The toner cartridges 5a, 5b, 5c, and 5d store toners of the colors that are supplied to the developing units 16a, 16b, 16c, and 16d, respectively. The toner cartridges 5a, 5b, 5c, and 5d store toners of yellow, cyan, magenta, and black respectively.

The toner feeding devices 6a, 6b, 6c, and 6d supply the toners of the colors stored in the toner cartridges 5a, 5b, 5c, and 5d to the developing units 16a, 16b, 16c, and 16d, respectively.

Toner images of respective colors developed on the photoreceptor drums 2a, 2b, 2c, and 2d are sequentially transferred to the intermediate transfer belt 7. The intermediate transfer belt 7 is disposed to be stretched around a driving roller 35 and a tension roller 36. Since the tension roller 36 is spring biased away from the driving roller 35 by a spring 38, a predetermined tension is applied to the intermediate transfer belt 7.

The primary transfer rollers 37a, 37b, 37c, and 37d are disposed across the intermediate transfer belt 7 from the photoreceptor drums 2a, 2b, 2c, and 2d.

Predetermined portions of the intermediate transfer belt 7 are sandwiched between the primary transfer rollers 37a, 37b, 37c, and 37d and the photoreceptor drums 2a, 2b, 2c, and 2d. The predetermined portions being sandwiched are pressed against surfaces of the photoreceptor drums 2a, 2b, 2c, and 2d. Primary transfer nips N1a, N1b, N1c, and N1d are thus formed. Then, the toner images of the colors developed on the photoreceptor drums 2a, 2b, 2c, and 2d are sequentially transferred to the intermediate transfer belt 7. A full-color toner image is thus formed on the intermediate transfer belt 7.

A primary transfer bias, for transferring the toner images of the colors developed on the photoreceptor drums 2a, 2b, 2c, and 2d to the intermediate transfer belt 7 respectively, is applied to each of the primary transfer rollers 37a, 37b, 37c, and 37d by a voltage application portion (not shown).

The secondary transfer roller 8 secondarily transfers the toner image, primarily transferred to the intermediate transfer belt 7, to the paper T. A secondary transfer bias for transferring the toner image on the intermediate transfer belt 7 to the paper T is applied to the secondary transfer roller 8, by a voltage application portion (not shown).

The secondary transfer roller 8 can be either in contact with or spaced apart from the intermediate transfer belt 7. More specifically, the secondary transfer roller 8 is configured to be movable between a contacting position that is in contact with the intermediate transfer belt 7 and a spaced position that is spaced apart from the intermediate transfer belt 7. In particular, the secondary transfer roller 8 is moved to the contacting position for transferring the toner image primarily transferred to a surface of the intermediate transfer belt 7 to the paper T, and to the spaced position in all other circumstances. Here, the secondary transfer roller 8 is moved to and away from the intermediate transfer belt 7 by rotational movement of the entire intermediate transfer unit 200.

The secondary transfer roller 8 is included in the intermediate transfer unit 200. The intermediate transfer unit 200 includes: a housing 201 that stores and pivotally supports the secondary transfer roller 8; a rotation driving gear 210 disposed on a lateral face of the housing 201; a roller-side gear 230 disposed on the lateral face of the housing 201 in a direction of a rotational axis of the secondary transfer roller 8; and an idle gear 220 disposed to be in contact with the rotation driving gear 210 and the roller-side gear 230. The intermediate transfer unit 200 is rotationally moved on a rotational axis (not shown) by an attaching/detaching portion (not shown), between a position where the secondary transfer roller 8 can be in contact with the intermediate transfer belt 7 and a position where the secondary transfer roller 8 is not in contact with the intermediate transfer belt 7.

An opposing roller 108 is disposed across the intermediate transfer belt 7 from the secondary transfer roller 8. A predetermined portion of the intermediate transfer belt 7 is sandwiched between the secondary transfer roller 8 and the opposing roller 108. The paper T is pressed against a surface (a side to which the image is primarily transferred) of the intermediate transfer belt 7. A secondary transfer nip N2 is thus formed and the toner image primarily transferred to the intermediate transfer belt 7 is transferred to the paper T.

The fixing device 9 fuses and fixes color toners constituting the toner image secondarily transferred to the paper T. The fixing device 9 includes a heating roller 9a that is heated by a heater, and a pressurizing roller 9b that is pressurized contact with the heating roller 9a. The heating roller 9a and the pressurizing roller 9b sandwiches and conveys the paper T to which the toner image is secondarily transferred. The paper T is conveyed in a state of being sandwiched between the heating roller 9a and the pressurizing roller 9b, thereby fusing and fixing the toner transferred thereto.

A belt cleaning device 40 for cleaning the intermediate transfer belt 7 is disposed between the secondary transfer roller 8 and the tension roller 36. The belt cleaning device 40 includes a cleaning brush 41 that contacts to slide on the surface of the intermediate transfer belt 7; a cleaning roller 42 disposed so as to contact the cleaning brush 41; a blade 43 disposed so that a tip thereof contacts a surface of the cleaning roller 42; and a collection spiral 44 disposed below the blade 43.

The paper feeding cassette 52 for housing the paper T is disposed to be horizontally slidable on a lower side of the device main body M in a vertical direction. The paper feeding cassette 52 stores the paper T in a state of being stacked. The paper feeding cassette 52 includes a paper tray 60 on which the paper T is placed. The paper T arranged on the paper tray is dispatched to the paper path 54 by a cassette feeding portion 51 disposed in an end portion of the paper feeding cassette 52 on a side of dispatching the paper (in a right end portion of FIG. 1). The cassette feeding portion 51 includes a double feed preventing mechanism composed of: a forward feed roller 61 for picking up the paper T on the paper tray 60; and a roller pair 63 for feeding the paper T one sheet at a time to the paper path 54.

The paper path 54 for conveying the paper T is formed between the cassette feeding portion 51 and an ejection portion 50. The paper path 54 includes: a first paper path 55 from the cassette feeding portion 51 to the secondary transfer roller 8; a second paper path 56 from the secondary transfer roller 8 to the fixing device 9; and a third paper path 57 from the fixing device 9 to the ejection portion 50. A diverter arm 58 is provided at an exit of the fixing device 9. A reverse paper path 59 for returning the paper T to the first paper path 55 is provided between the diverter arm 58 and a curved path 55a (described later) in the first paper path 55.

The first paper path 55 includes the curved path 55a for conveying the paper T, dispatched from the paper feeding cassette 52, vertically upward and changing a conveying direction thereof to leftward in FIG. 1, and a straight path 55b from the curved path 55a to the secondary transfer roller 8. A guide plate and a pair of rollers for guiding and conveying the paper T are disposed in the first paper path 55. In addition, a sensor for detecting the paper T and a resist roller pair 80 for skew compensation of the paper T and timing adjustment with respect to the toner image are disposed in the first paper path 55. The sensor is disposed immediately before the resist roller pair 80 in a conveying direction of the paper T (on an upstream side thereof in the conveying direction). The resist roller pair 80 conveys the paper T while performing the abovementioned compensation and the timing adjustment based on detection information from the sensor.

The second paper path 56 is a straight paper path that is declivitous toward the fixing device 9. A conveyor belt 156 for conveying the paper T placed thereon is disposed in the second paper path 56. In addition, a sensor for detecting the paper T is disposed in a predetermined position on the second paper path 56.

The third paper path 57 is formed to be acclivitous from the exit of the fixing device 9 toward an upper left portion in FIG. 1. The third paper path 57 is configured to include a vertical paper path 57a that is provided on a downstream side of the diverter arm 58 in the conveying direction and formed to be acclivitous. The paper T conveyed on the third paper path 57 passes above the diverter arm 58, and is then conveyed substantially vertically upward. Subsequently, the paper T is ejected from the ejecting portion 50 to the outside of the device main body M. The third paper path 57 is configured to include a guide plate and a pair of rollers for guiding and conveying the paper T, as with other paper paths.

The reverse paper path 59 is formed to branch downward from the diverter arm 58 to an opposite direction to the third paper path 57, pass vertically below the fixing device 9, the second paper path 56, the secondary transfer roller 8 and the resist roller pair 80, and then go vertically upward. The reverse paper path 59 is formed to join the curved path 55a in the first paper path 55. The reverse paper path 59 is a paper path for returning the paper T having passed through the fixing device 9 to an upstream side of the resist roller pair 80 that is disposed on an upstream side of the secondary transfer roller 8. The reverse paper path 59 is a paper path used for duplex printing, in which toner images (including letters and the like) are printed on both sides of the paper T. The paper T is, for example, returned to the first paper path 55 via the reverse paper path 59, in a state of being reversed by a reversing roller 600. The reverse paper path 59 is, as with other paper paths, configured to include a guide plate and a pair of rollers for guiding and conveying the paper T, and includes a sensor for detecting paper in a predetermined position.

The manual feeding portion 64 is provided on the right side of the device main body M in FIG. 1, above the feeding cassette 52. The manual feeding portion 64 includes the manual feeding tray 65, which constitutes a side wall in a closed state, and a feeding roller 66. The manual feeding tray 65 is connected by a lower end thereof so as to be rotatable (openable and closable), in the vicinity of the curved path 55a of the first paper path 55. The manual feeding portion 64 feeds the paper T placed on the manual feeding tray 65 in an open state to the curved path 55a of the first paper path 55.

The reader portion 301 constituting the image reading device 300 is described hereinafter with reference to FIGS. 2 to 7B.

Figure 2:
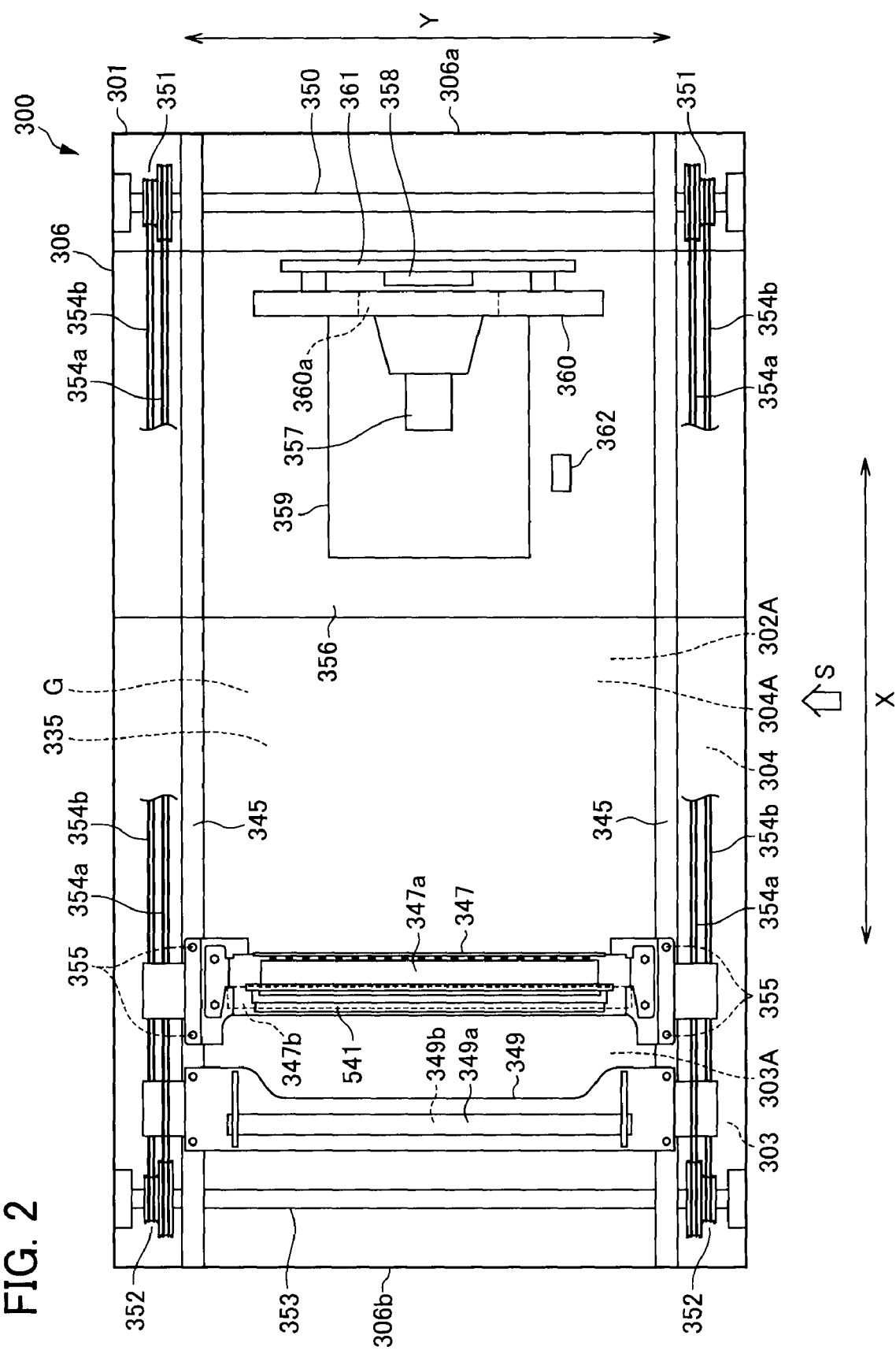
FIG. 2 is a schematic plan view of an internal configuration of a reader portion 301.
Figure 3:
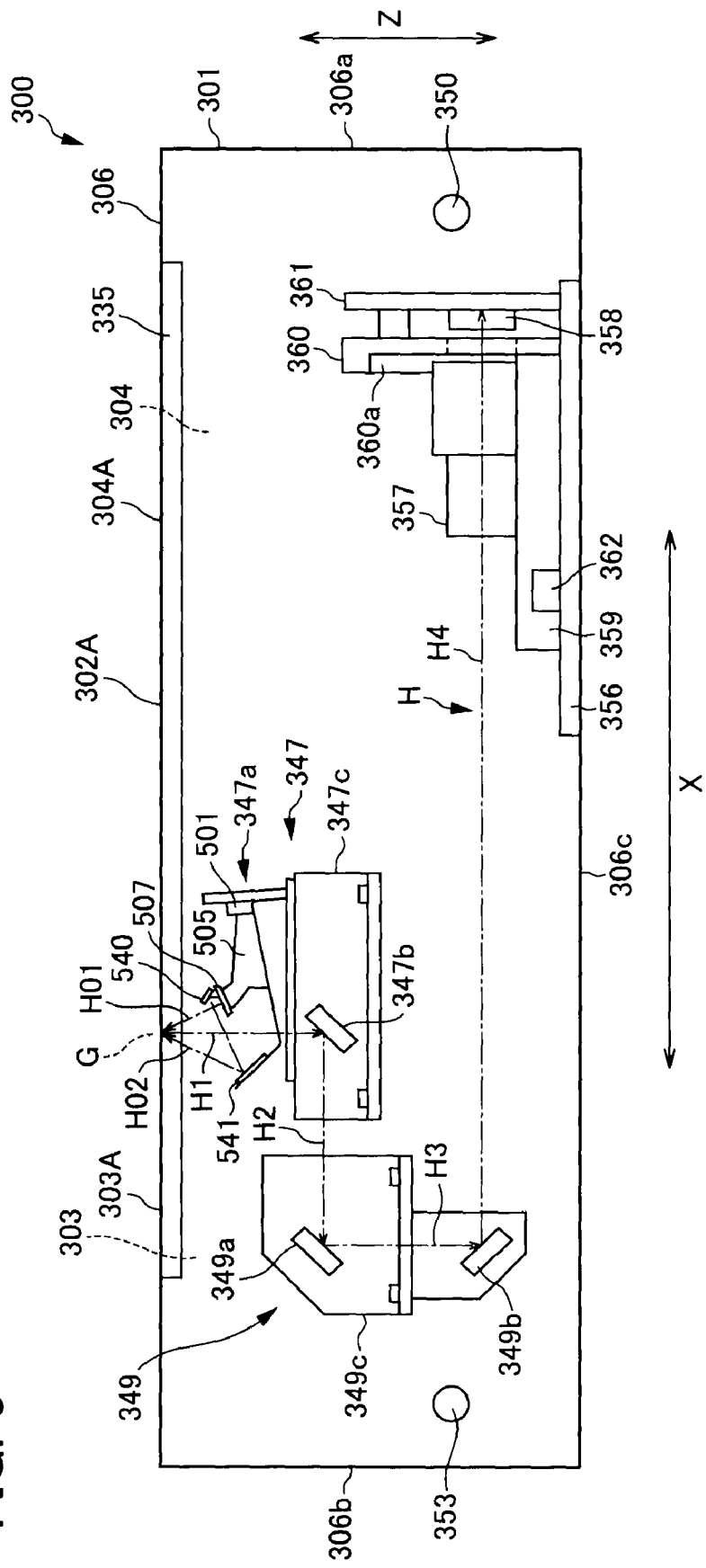
FIG. 3 is a diagram of FIG. 2 viewed from a direction of an arrow S, and it should be noted that FIG. 3 is a schematic view in which members shown in FIG. 2 are omitted for illustrative purposes.
Figure 4:
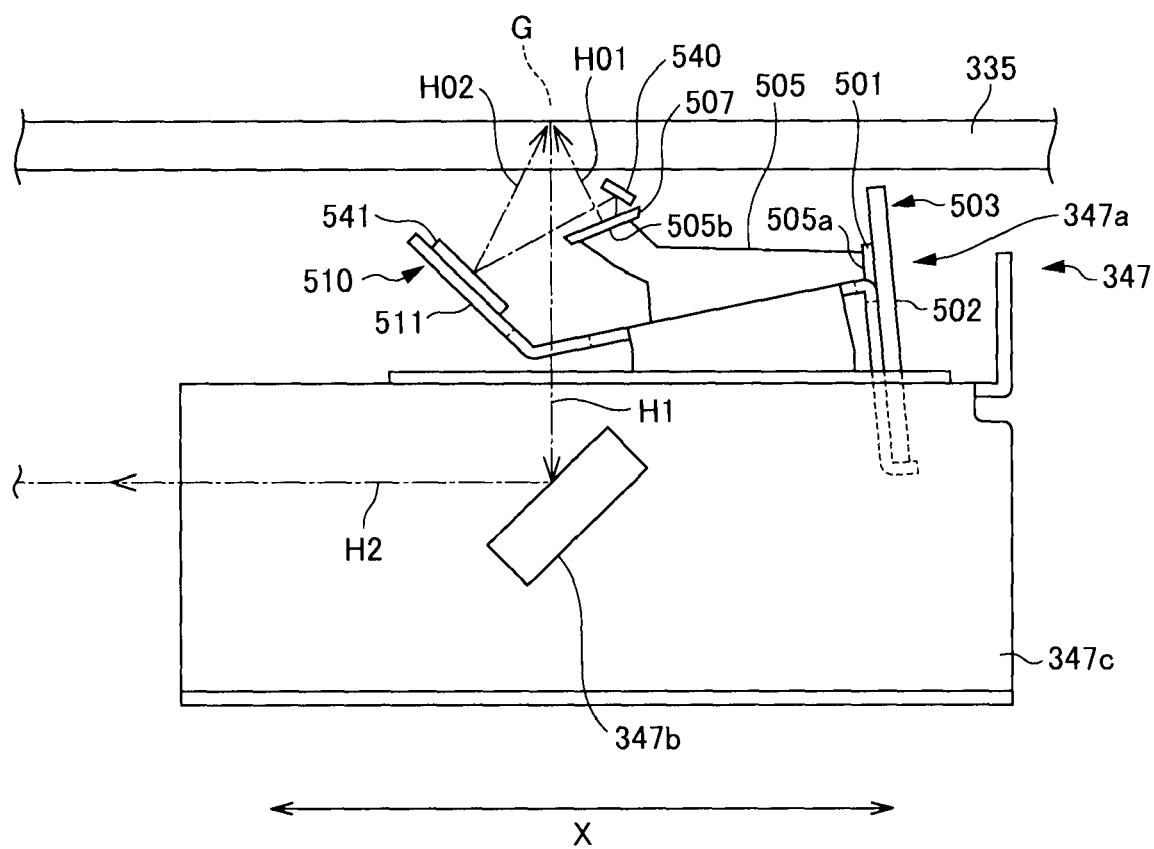
Figure 5:
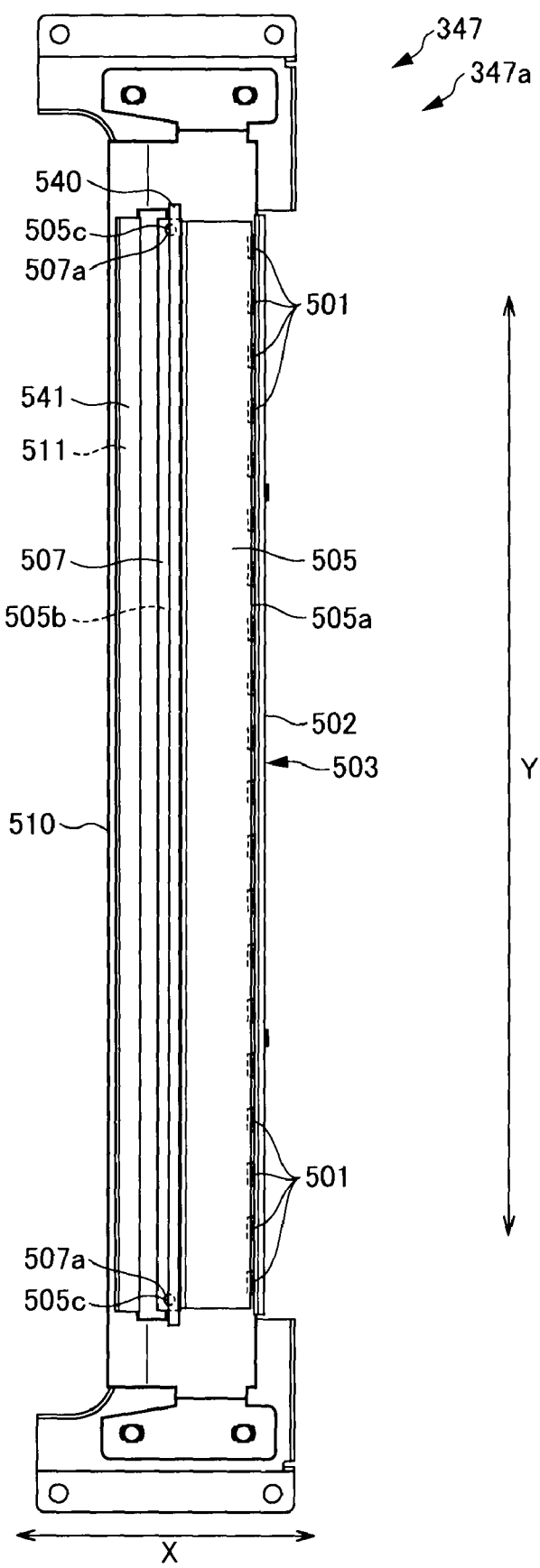
Figure 6A:
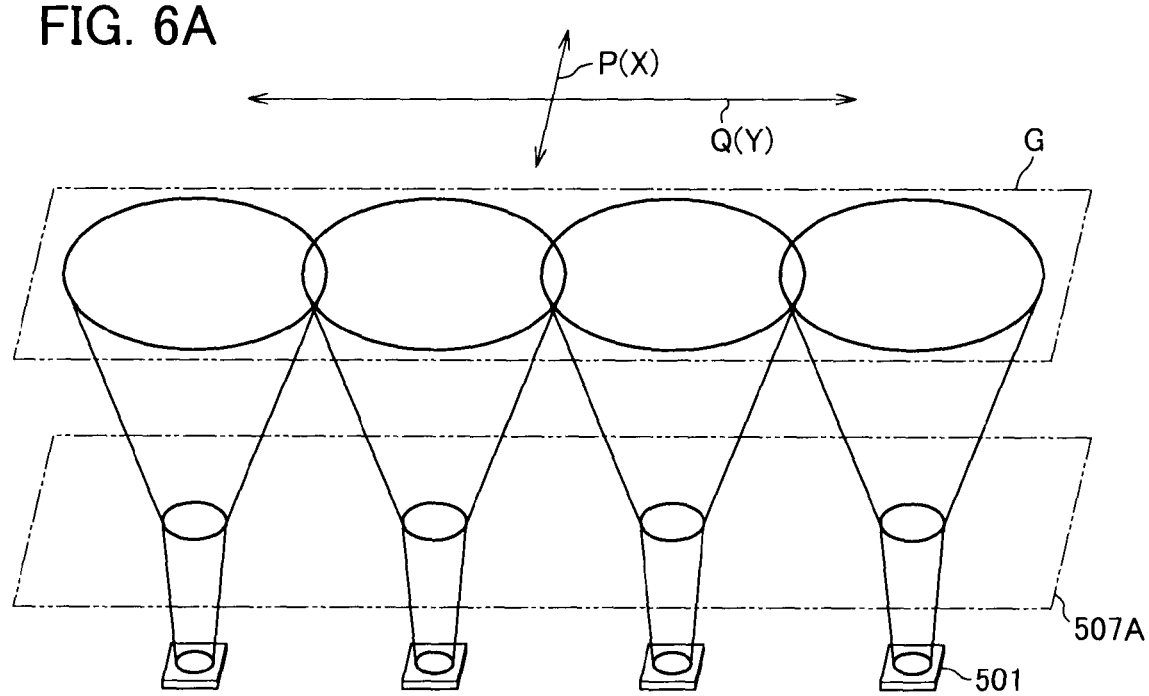
FIG. 6A is a schematic view illustrating the diffusion of light in a case where a conventional diffuser plate 507A is used.
Figure 6B:
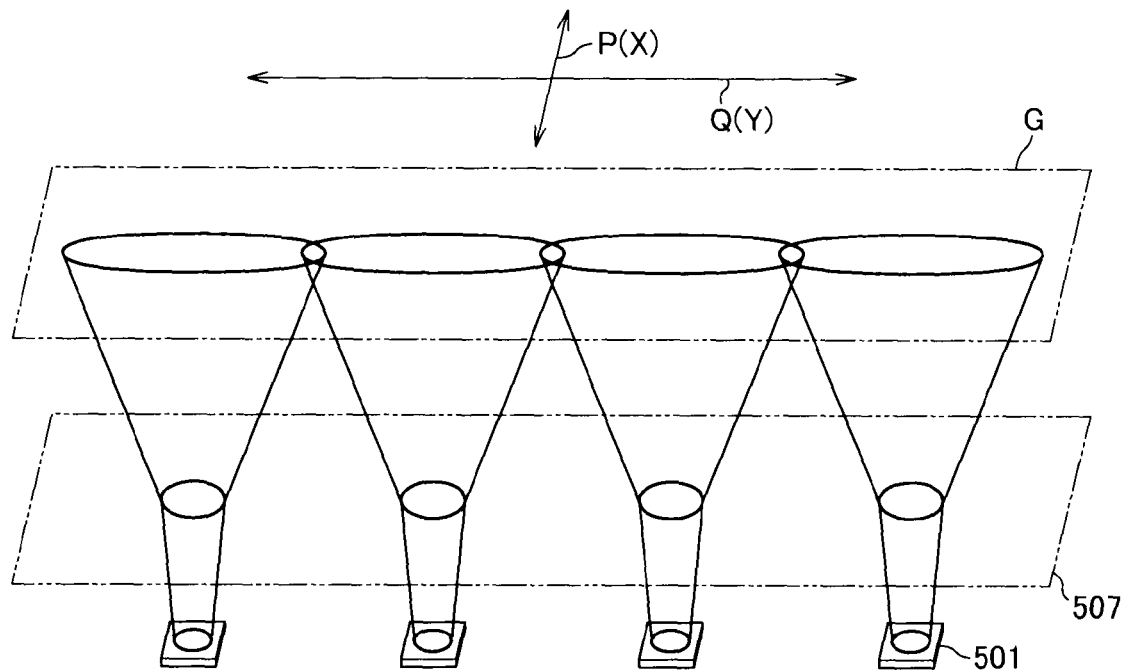
FIG. 6B is a schematic view illustrating the diffusion of light in a case where an elliptical diffuser plate 507 is used.
Figure 7A:
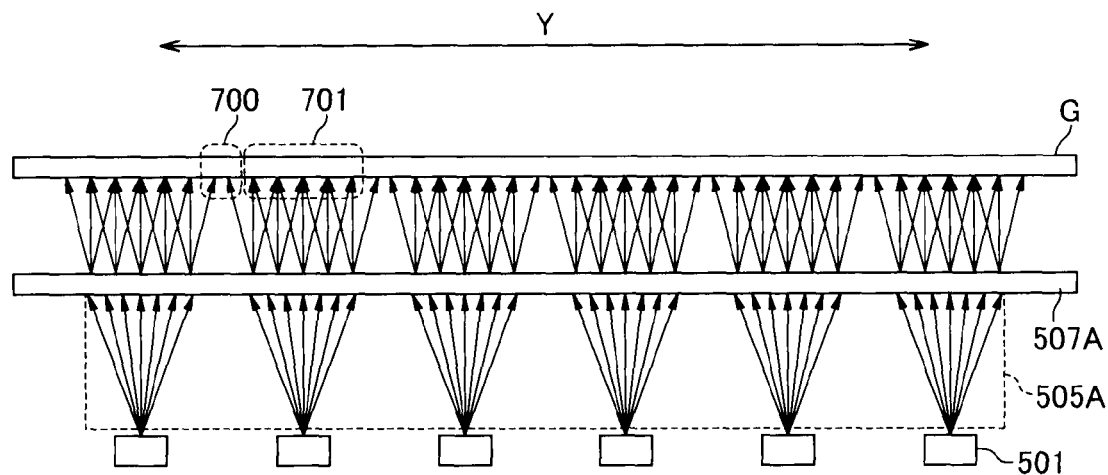
FIG. 7A is a diagram showing an example of a positional arrangement of the elliptical diffuser plate 507.
Figure 7B:
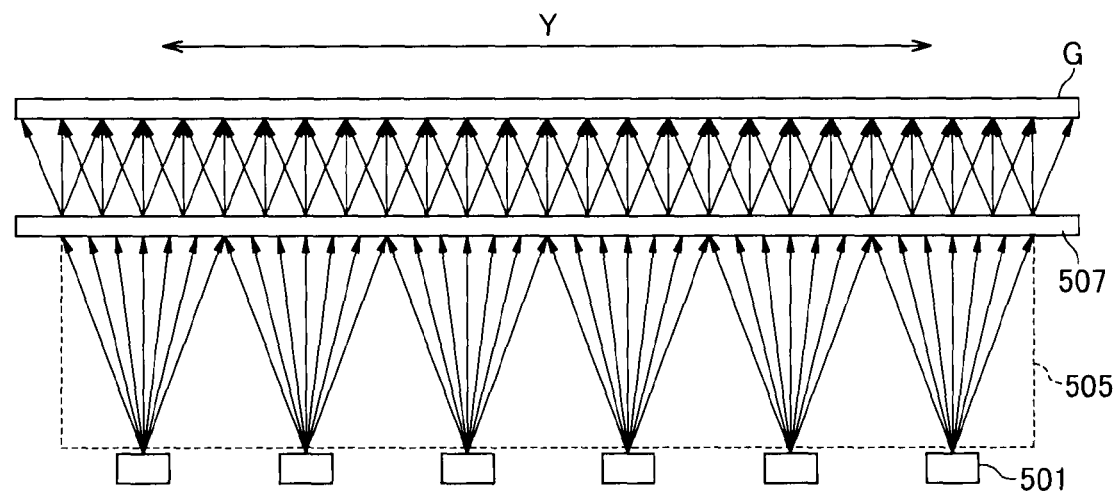
FIG. 7B is a diagram showing another example of a positional arrangement of the elliptical diffuser plate 507.

FIG. 2 is a schematic plan view of an internal configuration of the reader portion 301. FIG. 3 is a diagram of FIG. 2 viewed from a direction of an arrow S. It should be noted that FIG. 3 is a schematic view, accordingly omitting members shown in FIG. 2 for illustrative purposes. FIG. 4 is a cross-sectional view showing a configuration of the illumination portion 347a. FIG. 5 is a plan view showing a configuration of the illumination portion 347a. FIG. 6A is a schematic view showing the diffusion of light in a case where a conventional diffuser plate 507A is used. FIG. 6B is a schematic view showing the diffusion of light in a case where an elliptical diffuser plate 507 is used. FIG. 7A is a diagram showing an example of an arrangement of the elliptical diffuser plate 507. FIG. 7B is a diagram showing another example of an arrangement of the elliptical diffuser plate 507.

As shown in FIGS. 2 and 3, the reader portion 301 includes: a contact glass 335 on which the original G is placed; a pair of guide rails 345; a drive shaft 350 to which drive pulleys 351 are attached; a spindle 353 to which driven pulleys 352 are attached; an illumination unit 347 as the illumination portion; a mirror unit 349; an imaging lens 357; a CCD 358 as the reader portion; and an optical sensor 362.

As shown in FIG. 2, the reader portion 301 includes the contact glass 335 disposed on an upper face (on a front side of FIG. 2), on which the original G is placed. The contact glass 335 is disposed substantially in parallel to a horizontal plane in a case where the color copy machine 1 is disposed in a normal state.

As shown in FIG. 2, the pair of guide rails 345 is disposed between lateral faces 306a and 306b (on the left and the right in FIG. 2) of the reader portion 301. The pair of guide rails 345 is disposed in parallel with the abovementioned contact glass 335 (see FIG. 3). The illumination unit 347 and the mirror unit 349 are movably disposed on the pair of guide rails 345.

As shown in FIG. 2, the drive shaft 350 is disposed on a side to the lateral face 306a, so as to be orthogonal to the pair of guide rails 345. The drive shaft 350 is driven for normal and reverse rotation by a driving motor (not shown). The drive pulleys 351 each having a major diameter portion and a minor diameter portion are attached at both ends of the drive shaft 350, which is disposed more outward in the main scanning direction Y than the guide rails 345.

As shown in FIG. 2, the spindle 353 is disposed on a side to the lateral face 306b, so as to be orthogonal to the pair of guide rails 345. The driven pulleys 352 having the same diameter as the drive pulleys 351 are attached at both ends of the spindle 353, which is disposed more outward in the main scanning direction Y than the guide rails 345.

A driving wire 354a with a loop shape is wound on the major diameter portions of the drive pulley 351 and the driven pulley 352. Then, the illumination unit 347 is fixed to the driving wire 354a.

In addition, circular driving wires 354b is wound on the minor diameter portions of the drive pulleys 351 and the driven pulleys 352. Additionally, the mirror unit 349 is fixed to the driving wire 354b.

The circular driving wires 354a and 354b are rotated (in a direction of a loop) in accordance with rotation of the drive shaft 350 by the driving motor. As a result, the illumination unit 347 and the mirror unit 349 are moved in the sub-scanning direction X (in a horizontal direction of the drawing) along the pair of guide rails 345, in accordance with rotation of the circular driving wires 354a and 354b. Since a ratio of diameters between the major diameter portion and the minor diameter portion, in the drive pulley 351 and the driven pulley 352, is 2:1, a ratio of travel distance between the illumination unit 347 and the mirror unit 349 is also 2:1.

Here, two contacts 355 are provided on each portion of the illumination unit 347 and the mirror unit 349 contacting upper faces of the guide rails 345. The contacting surface of each of the contacts 355 with the guide rails 345 is made to be spherical. This allows for smooth movement of the illumination unit 347 and the mirror unit 349 in the sub-scanning direction X.

As shown in FIG. 2, an ISU base 356 as a supporting member is attached to a bottom face of the reader portion 301 on a side to the lateral face 306a. The imaging lens 357 and the CCD 358 as the reader portion are attached to an upper face of the ISU base 356 in a predetermined positional relationship.

As shown in FIG. 2, the imaging lens 357 is mounted on a lens supporting mount 359 that is fixed on the ISU base 356. The lens supporting mounting 359 is disposed so that a position thereof can be adjusted by a guiding member 360 disposed on a side to the CCD 358. The imaging lens 357 is disposed substantially in a center of the reader portion 301 in the sub-scanning direction X. The imaging lens 357 is disposed on a side to an end portion that is opposite to a side to the original G on the light path H (see FIG. 3). The imaging lens 357 forms an image in a predetermined position from the luminous flux H4 (see FIG. 3) incident thereon. In other words, the imaging lens 357 forms an image of the original G in the predetermined position.

As shown in FIG. 2, the CCD 358 is mounted on a CCD substrate 361 disposed on a back surface of the guiding member 360. The CCD 358 is disposed in an imaging position of the imaging lens 357. Luminous flux from the imaging lens 357 is incident on the CCD 358 via an open window 360a formed in the vicinity of a center of the guiding member 360. A light axis of the luminous flux incident upon the CCD 358 is compensated by fine-tuning the position of the guiding member 360.

The optical sensor 362 is disposed on the ISU base 356. The optical sensor 362 determines the size of the original G (in a horizontal direction in FIG. 2) based on whether a reflected light is received from the original G placed on the contact glass 335.

As shown in FIG. 3, the illumination unit 347 includes: an illumination portion 347a as the illumination portion; a first mirror 347b; and a first frame body 347c for housing the illumination portion 347a and the first mirror 347b.

The illumination portion 347a includes: a plurality of LEDs 501 as the plurality of luminescence portions; a light guiding body 505 disposed in the vicinity of or in contact with the plurality of LEDs 501; an elliptical diffuser plate 507 as the diffuser plate disposed in the light guiding body 505 on a side to the contact glass 335; a first reflection mirror 540 that reflects a portion of the light, which is diffused by the elliptical diffuser plate 507, toward a second reflection mirror 541

(described later); and a second reflection mirror 541 that irradiates the original with light from the first reflection mirror 540.

The illumination portion 347a is described later in detail.

The first mirror 347b is disposed on a lower side of the first illumination unit 347 in a thickness direction Z. The first mirror 347b is disposed so as to direct a reflective surface thereof toward the original G and the second mirror 349a. The first mirror 347b reflects the luminous flux H1 from the original G to direct the luminous flux H1 toward the second mirror 349a.

The first frame body 347c houses the illumination portion 347a and the first mirror 347b. The first frame body 347c is fixed to the driving wire 354a (see FIG. 2) wound on the major diameter portions of the drive pulley 351 and the driven pulley 352 (see FIG. 2). The first frame body 347c is moved in the sub-scanning direction X along the pair of guide rails 345, in accordance with rotation of the driving wires 354a and 354b.

As shown in FIG. 3, the mirror unit 349 includes: a second mirror 349a; a third mirror 349b; and a second frame body 349c for housing the second mirror 349a and the third mirror 349b.

The second mirror 349a is disposed on an upper side of the second frame body 349c in a thickness direction Z. The second mirror 349a is disposed so as to direct a reflective surface thereof toward the first mirror 347b and the third mirror 349b. The second mirror 349a reflects a luminous flux H2 from the first mirror 347b to direct the luminous flux H2 toward the third mirror 349b.

The third mirror 349b is disposed on a lower side of the second frame body 349c in a thickness direction Z. The third mirror 349b is disposed so as to direct a reflective surface thereof toward the second mirror 349a and the imaging lens 357. The third mirror 349b reflects a luminous flux H3 from the second mirror 349a to direct the luminous flux H3 toward the imaging lens 357.

The first mirror 347b, the second mirror 349a, and the third mirror 349b form a light path H so that the light from the original G is incident on the imaging lens 357. As described above, since the illumination unit 347 moves in the sub-scanning direction X at a speed A while the mirror unit 349 moves in the sub-scanning direction X at a speed A/2, the length of the light path H is kept constant even while reading an image.

Here, the illumination portion 347a is described in detail with reference to FIGS. 4 to 7B.

As shown in FIG. 4, the illumination portion 347a includes: an LED unit 503 to which a plurality of LEDs 501 is attached; the light guiding body 505; the elliptical diffuser plate 507; a first reflection mirror 540 that reflects a portion of the light, which is diffused by the elliptical diffuser plate 507, toward a second reflection mirror 541; a second reflection mirror 541 that irradiates the original with light from the first reflection mirror 540; and an attaching member 510 to which the LED unit 503, the light guiding member 505, the elliptical diffuser plate 507, the first reflection mirror 540, and the second reflection mirror 541 are attached.

The LED unit 503 includes the plurality of LEDs 501 and a metallic plate-like member 502 of high rigidity to which the plurality of LEDs 501 is attached.

As shown in FIG. 5, the plurality of LEDs 501 is respectively attached to the plate-like member 502 with spaces therebetween. The plurality of LEDs 501 is respectively arranged in the main scanning direction Y at regular intervals. The plurality of LEDs 501 is respectively attached to the metallic attaching member 510 of high rigidity via the plate-like member 502. Each of the plurality of LEDs emits light for irradiating the original G. Here, the number of and interval between the plurality of LEDs 501 are configured in accordance with the function and positional relationship of the light guiding body 505 and the elliptical diffuser plate 507 (described later), and the positional relationship of the first reflection mirror 540 and the second reflection mirror 541.

As shown in FIG. 4, the light guiding body 505 is disposed so that a first end 505a faces the plurality of LEDs 501 and a second end 505b faces the contact glass 335. The light guiding body 505 guides light from each of the plurality of LEDs 501 toward the contact glass 335. The light guiding body 505 causes light incident from a first end 505a side to be emitted from a the second end 505b side. The light guiding body 505 guides light to the elliptical diffuser plate 507 while suppressing unnecessary diffusion. The shape and size of the light guiding body 505 is configured by features of the elliptical diffuser plate 507, degree of diffusion of light from the LED 501, and the like.

As shown in FIG. 4, the elliptical diffuser plate 507 is disposed between the light guiding body 505 and the original G. More specifically, the elliptical diffuser plate 507 is attached to the second end 505b of the light guiding body 505. In particular, the elliptical diffuser plate 507 is attached in a state of being placed on the second end 505b of the light guiding body 505. The elliptical diffuser plate 507 is attached to the second end 505b of the light guiding body 505 by, for example, an adhesive or adhesion tape. The elliptical diffuser plate 507 can be positioned and fixed by inserting positioning portions 505c and 505c (see FIG. 5) formed on the light guiding body 505 into hole portions 507a and 507a (see FIG. 5) formed on the elliptical diffuser plate 507. Here, a portion of the light that is diffused by the elliptical diffuser plate 507 and not reflected by the first reflection mirror 540 (described later) is directly incident upon the original G through a contact glass 335.

As shown in FIG. 4, the first reflection mirror 540, as a reflective member that is an example of the light splitting portion, is disposed between the elliptical diffuser plate 507 and the original. The first reflection mirror 540 is disposed above the elliptical diffuser plate 507 and dominantly on a first side in the sub-scanning direction X. The first reflection mirror 540 is disposed so as to direct a reflective surface thereof toward the second reflection mirror 541. The first reflection mirror 540 reflects a portion of the light, which is diffused by the elliptical diffuser plate 507, toward the second reflection mirror 541. More specifically, the first reflection mirror 540 splits light that is diffused by the elliptical diffuser plate 507, into first diffused light H01 and second diffused light H02, where the first diffused light H01 is directly incident upon the original G and the second diffused light H02 is incident upon the second reflection mirror 541.

As shown in FIG. 4, the second reflection mirror 541 as the reflective portion is mounted on a mirror mount 511 on the attaching member 510. The second reflection mirror 541 is disposed so as to direct a reflective surface thereof toward the first reflection mirror 541 and the original G. The second reflection mirror 541 is disposed on the other side of the elliptical diffuser plate 507 in the sub-scanning direction X across the luminous flux H1. The second reflection mirror 541 reflects the first diffused light H01, which is reflected by the first reflection mirror 540, toward the original G. In other words, the second reflection mirror 541 reflects a portion of the light, which is diffused by the elliptical diffuser plate 507 and not directly incident upon the original G, and irradiates the original G therewith.

As described above, the first diffused light H01, which is a portion of the light diffused by the elliptical diffuser plate 507, is incident upon the original G from a first side in the sub-scanning direction X. In addition, the second diffused light H02, which is also a portion of the light diffused by the elliptical diffuser plate 507, is reflected by the second reflection mirror 541 and incident upon the original G from a second side in the sub-scanning direction X. The first diffused light H01 and the second diffused light H02 are incident upon the original G from the first side and the second side in the sub-scanning direction, respectively.

Here, the elliptical diffuser plate 507 is a diffuser plate configured so that a diffusion rate in a predetermined direction and a diffusion rate in another direction that is orthogonal thereto are different. Hereinafter, the elliptical diffuser plate 507 is described by comparison with a conventional diffuser plate 507A.

As shown in FIG. 6, the conventional diffuser plate 507A uniformly diffuses light from the LED 501. In other words, the conventional diffuser plate 507A has a function of further diffusing light from the LED 501 from a natural state thereof.

As shown in FIG. 6B, the elliptical diffuser plate 507 is a diffuser plate configured so that a diffusion rate of the light from the LED 501 in a predetermined direction P and a diffusion rate thereof in another direction Q that is orthogonal thereto are different. More specifically, the elliptical diffuser plate 507 diffuses the light from the LED 501 at a low diffusion rate in the predetermined direction P and at a high diffusion rate in another direction Q. The elliptical diffuser plate 507 does not substantially diffuse the light from the LED 501 in the predetermined direction P, and diffuses the light from the LED 501 at a high diffusion rate in another direction Q. In this case, the intensity (volume) of light irradiated onto the original G is greater than in a case where the diffuser plate 507A shown in FIG. 6 is used. More specifically, the intensity of the first diffused light H01 and of the second diffused light H02 (see FIG. 4) becomes greater, thereby intensifying the light that is incident upon the original G.

In the present embodiment, the elliptical diffuser plate 507 is disposed so that the predetermined direction is along the sub-scanning direction X, and the other direction is along the main scanning direction Y. In other words, the elliptical diffuser plate 507 diffuses the light at a low diffusion rate in the sub-scanning direction X and at a high diffusion rate in the main scanning direction Y.

The elliptical diffuser plate 507 is disposed at a position with a small difference in light intensity in the main scanning direction Y. Preferably, the elliptical diffuser plate 507 is disposed at a position substantially without difference in light intensity in the main scanning direction Y. Hereinafter, a reason for disposing the elliptical diffuser plate 507 at a position with a small difference in light intensity in the main scanning direction Y is explained.

As shown in FIG. 7A, in a case where the elliptical diffuser plate 507 is disposed in a position where the light from the LEDs 501 is not sufficiently diffused (a position with a difference in light intensity), the light diffused and irradiated onto the original G by the elliptical diffuser plate 507 includes a portion of lower light intensity 700 and a portion of higher light intensity 701. In other words, the intensity of the light irradiated onto the original G is uneven in the main scanning direction Y.

Here, in a case where a gloss black colored original G curled vertically upward (upward in FIG. 7A) is irradiated with light, specularly reflected light from the original G is incident on the CCD 358 (see FIGS. 2 and 3). In this case, since the intensity of the light irradiated onto the original G is uneven, the same number of point-like flare images as the LEDs 501 is formed on an image being read.

As shown in FIG. 7B, in a case where the elliptical diffuser plate 507 is disposed at a position where the light from the LEDs 501 is sufficiently diffused (a position with small difference in light intensity), the light diffused and irradiated onto the original G by the elliptical diffuser plate 507 is diffused so that a difference in light intensity is small. The elliptical diffuser plate 507 is disposed at a position at which a difference in light intensity in the main scanning direction of light from the plurality of LEDs 501 is smaller than in the vicinity of a light-emitting face of the plurality of LEDs 501. In other words, the light irradiated onto the original G is made to be substantially uniform. In this case, even if the gloss black colored original G curled vertically upward is irradiated with light and the specularly reflected light therefrom is incident on the CCD 358 (see FIGS. 2 and 3), point-like flare images are not formed on the image being read.

For the reason described above, the elliptical diffuser plate 507 is disposed at a position with a small difference in light intensity in the main scanning direction Y, and preferably at a position substantially without difference in light intensity in the main scanning direction Y.

Here, the abovementioned light guiding body 505 (see FIG. 4) is configured to have a length (in a direction of light travel) with which the difference in intensity of the light incident upon the elliptical diffuser plate 507 is small.

As shown in FIG. 4, the attaching member 510 is disposed on a vertically upper side (upper side in FIG. 4) in the first frame body 347c. The LED unit 503, the light guiding body 505, the first reflection mirror 540, and the second reflection mirror 541 are attached to the attaching member 510. The plurality of LEDs 501 is attached to the attaching member 510 via the LED unit 503. The elliptical diffuser plate 507 is attached to the attaching member 510 via the light guiding body 505. In other words, the attaching member 510 maintains a positional relationship between the plurality of LEDs 501 and the elliptical diffuser plate 507. In addition, the first reflection mirror 540 and the second reflection mirror 541 are attached to the attaching member while reciprocally maintaining a positional relationship therebetween.

Next, operations in the image reading device 300 according to the present embodiment are described.

First, the original feeder portion 70 (see FIG. 1) is made to be in an open state and the original G is placed on a second reading surface 304A (see FIG. 3) constituting the reading surface 302A (see FIG. 2). The illumination unit 347 and the mirror unit 349 (see FIG. 3) are brought to the second position 304 (see FIG. 3) as the optical sensor 362 (see FIG. 3) detects that the original G is placed on the second reading surface 304A.

Subsequently, the original feeder portion 70 is made to be in a closed state. When a start switch (not shown) is pressed, the color copy machine 1 is instructed to copy an image of the original G. When a start switch (not shown) is pressed, the image reading device 300 starts an operation of reading the image of the original G.

More specifically, first, the plurality of LEDs 501 (see FIG. 3) is turned on. Light from the plurality of LEDs 501 thus turned on is incident upon the elliptical diffuser plate 507 (see FIG. 3) via the light guiding body 505 (see FIG. 3). The light incident upon the elliptical diffuser plate 507 is diffused in the main scanning direction Y and not substantially diffused in the sub-scanning direction X. A portion of the diffused light is reflected by the first reflection mirror 540 (see FIG. 3) toward the second reflection mirror 541 (see FIG. 3) (the second diffused light H02 (see FIG. 4)). Subsequently, the light from the first reflection mirror 540 (the second diffused light H02) is reflected by the second reflection mirror 541 and incident upon the original G. In addition, light that is not reflected by the first reflection mirror 540 (the first diffused light H01 (see FIG. 4)), which is a portion of the diffused light, is directly incident upon the original G. The first diffused light H01 is incident from a lower side in a vertical direction and the first side in the sub-scanning direction X, and the second diffused light H02 is incident from a lower side in a vertical direction and the second side in the sub-scanning direction X, upon the original G. The original G is irradiated with line-like light that extends in the main scanning direction Y.

As described above, the light irradiated onto the original G is adjusted to have a uniform intensity in the main scanning direction Y. In addition, since the light irradiated onto the original G is not substantially diffused in the sub-scanning direction X, the intensity of the light per unit area is greater than in a case where a conventional diffuser plate is used or where a diffuser plate is not used.

The illumination unit 347 and the mirror unit 349 are moved in the sub-scanning direction X while irradiating light onto the original G. The illumination unit 347 and the mirror unit 349 are moved while maintaining a length of the light path H constant.

A luminous flux from the original G is incident upon the imaging lens 357 after being reflected by the first mirror 347b, the second mirror 349a, and the third mirror 349b (see FIG. 3).

The imaging lens 357 forms an image of the original G. The CCD 358 disposed in the imaging position reads the image of the original G as image data, based on the image formed on the CCD 358 via the open window 360a of the guiding member 360 (see FIG. 3).

Here, since the light from the elliptical diffuser plate 507 is adjusted to have a uniform intensity in the main scanning direction Y, for example, even in a case where the specularly reflected light from the gloss black colored curled original G is incident on the CCD 358, the point-like flare images are not formed on the image being read.

In addition, since the light from the elliptical diffuser plate 507 is adjusted to have a uniform intensity in the main scanning direction Y, the image of the original G is read appropriately.

Furthermore, since the original G is irradiated with light from the first and the second sides in the sub-scanning direction X by splitting light from the elliptical diffuser plate 507, generation of an edge shadow on an image being read can be suppressed (see FIG. 3).

The image information read by the CCD 358 is output to the CCD substrate 361. The image information being output to the CCD substrate 361 is then output to the device main body M via a predetermined circuit substrate (see FIG. 3).

The image information being input is input to an image forming control unit (not shown) in the device main body M. The image forming control unit controls the photoreceptor drum 2 as the image supporting body, the charging portion 10, the laser scanner unit 4, the developing unit 16 and the like constituting the image forming portion, based on the image information. A predetermined toner image is formed on the photoreceptor drum 2 based on the image information (see FIG. 1).

An image similar to the image of the original G is transferred to the paper T, which is conveyed to the transfer nip N formed by the photoreceptor drum 2, based on the image information. The paper T, on which the image is formed, is ejected from the ejecting portion 50 to the outside of the device main body M (see FIG. 1).

According to the present embodiment, an image reading device 300 can be provided that suppresses uneven intensity of light emitted on the original G, by disposing the elliptical diffuser plate 507 between the original G and the plurality of LEDs 501. In addition, in this way, uneven color density and the generation of point-like flare images on the image being read can be suppressed.

Furthermore, according to the present embodiment, since light, which is a portion of light emitted from the plurality of LEDs 501 and not directly incident upon the original G, is incident upon the original G via the second reflection mirror 541 as the reflective portion, the generation of an edge shadow on an image being read can be suppressed. In other words, the present embodiment can suppress an edge shadow on an image being read, while also suppressing uneven color density and the generation of point-like flare images on the image being read.

In addition, according to the present embodiment, the elliptical diffuser plate 507 diffuses the light at a high diffusion rate in the main scanning direction Y and irradiates the original G therewith. This can reduce the number of LEDs 501 that are arranged in the main scanning direction Y. Therefore, material cost for the color copy machine 1 can be reduced.

In addition, according to the present embodiment, since s elliptical diffuser plate 507 with a low diffusion rate in the sub-scanning direction X is used, the intensity of the light per unit area can be made greater. Therefore, the image of the original G is appropriately read and the number of LEDs 501 can be reduced.

In addition, according to the present embodiment, since the elliptical diffuser plate 507 is disposed at a position where there is no unevenness in intensity of light incident thereupon, the light irradiated onto the original G can be made uniform.

Furthermore, according to the present embodiment, the first reflection mirror 540 reflects substantially uniform light without unevenness toward the second reflection mirror 541. As a result, the second reflection mirror 541 can irradiate the original G with substantially uniform light without unevenness from an opposite side in the sub-scanning direction X of the first diffused light H01 that is directly incident on the original G from the elliptical diffuser plate 507.

Moreover, in the present embodiment, the light from the plurality of LEDs 501 is guided to the elliptical diffuser plate 507 by means of the light guiding body 505, while suppressing unnecessary diffusion. Therefore, the light from the plurality of LEDs can be incident onto the elliptical diffuser plate 507 effectively.

In addition, the elliptical diffuser plate 507 can be attached at an appropriate position by adjusting the size of the light guiding body 505. In other words, by adjusting the size of the light guiding body 505 (length thereof in a direction of light travel) so as to fully diffuse the light from the plurality of LEDs 501, the light diffused by the elliptical diffuser plate 507 and irradiated onto the original G can be made uniform in the main scanning direction Y.

In addition, according to the present embodiment, the elliptical diffuser plate 507 is attached to the second end 505b of the light guiding body 505. This allows the elliptical diffuser plate 507 to be attached readily and firmly at a position where the light irradiated onto the original G is uniform.

Furthermore, according to the present embodiment, an LED unit 503 to which the plurality of LEDs 501 is attached, and the light guiding body 505 to which the elliptical diffuser plate 507 is attached, are attached to the metallic and high-rigidity attaching member 510. This maintains a positional relationship between the plurality of LEDs 501 and the elliptical diffuser plate 507. Light can thus be stably irradiated onto the original G without unevenness in the main scanning direction Y.

Moreover, according to the present embodiment, a color copy machine 1 including an image reading device providing the above effects can be provided. The color copy machine 1 can also provide similar effects as in the abovementioned image reading device 300.

In the present embodiment, the first reflection mirror 540 is described as the light splitting portion; however, the present invention is not limited thereto. For example, a reflective member having a mirror surface such as a transparent member having a three-dimensional figure (such as a triangular pole) or a bending member such as lens and polarizer can also be used as the light splitting portion. Alternatively, the light splitting portion can be composed of a single member or a plurality of members. In addition, the light splitting portion can be disposed independently from or integrally with the elliptical diffuser plate 507.

A configuration in which a transparent member having a mirror surface is used as the light splitting portion is described with reference to FIG. 8.

Figure 8:
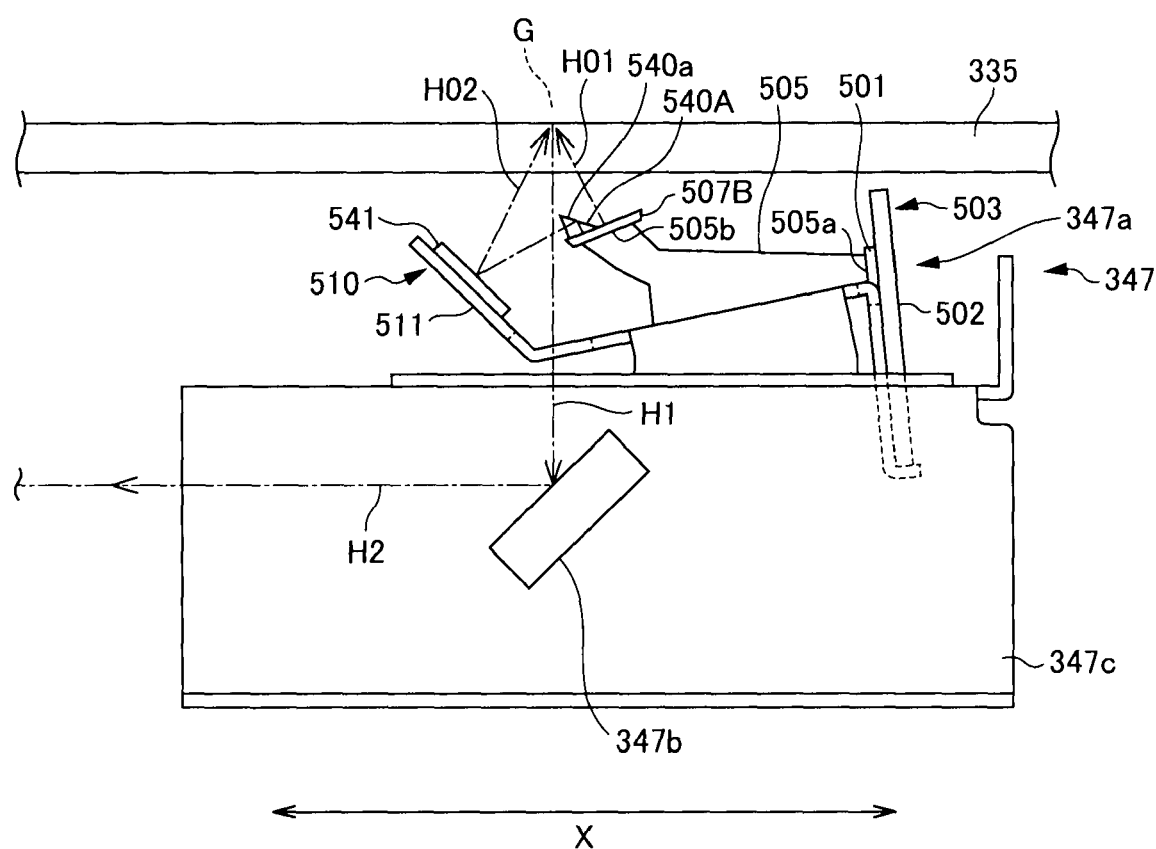

FIG. 8 is a diagram illustrating a case where a light splitting portion is a triangular pole-shaped transparent member 540A having a mirror surface 540a.

As shown in FIG. 8, the transparent member 540A as the light splitting portion is disposed such that the mirror surface 540a is at a predetermined angle with respect to the elliptical diffuser plate 507B. The transparent member 540A is mounted on the elliptical diffuser plate 507B. The mirror surface 540a can be supported at a predetermined angle without a supporting member, since the transparent member 540A is three-dimensional and transparent. This allows for the transparent member 540A as the light splitting portion to be disposed close to the second reflection mirror 541, regardless of a position of the luminous flux H1.

A portion of the light diffused by the elliptical diffuser plate 507B is directly incident upon the original G as the first diffused light H01. In addition, the portion of the light diffused by the elliptical diffuser plate 507B is reflected by the mirror surface 540a of the transparent member 540A toward the second reflection mirror 541, as the second diffused light H02. The second diffused light H02 is reflected by the second reflection mirror 541 and incident upon the original G.

Although the first reflection mirror 540 as the light splitting portion splits the diffused light into the second diffused light H02, the present invention is not limited thereto. The light splitting portion can split the diffused light into the first diffused light H01 that is directly incident upon the original G.

A case where a portion of the diffused light is split into a first diffused light H01 by means of the first reflection mirror 540B as the light splitting portion is described with reference to FIG. 9.

Figure 9:
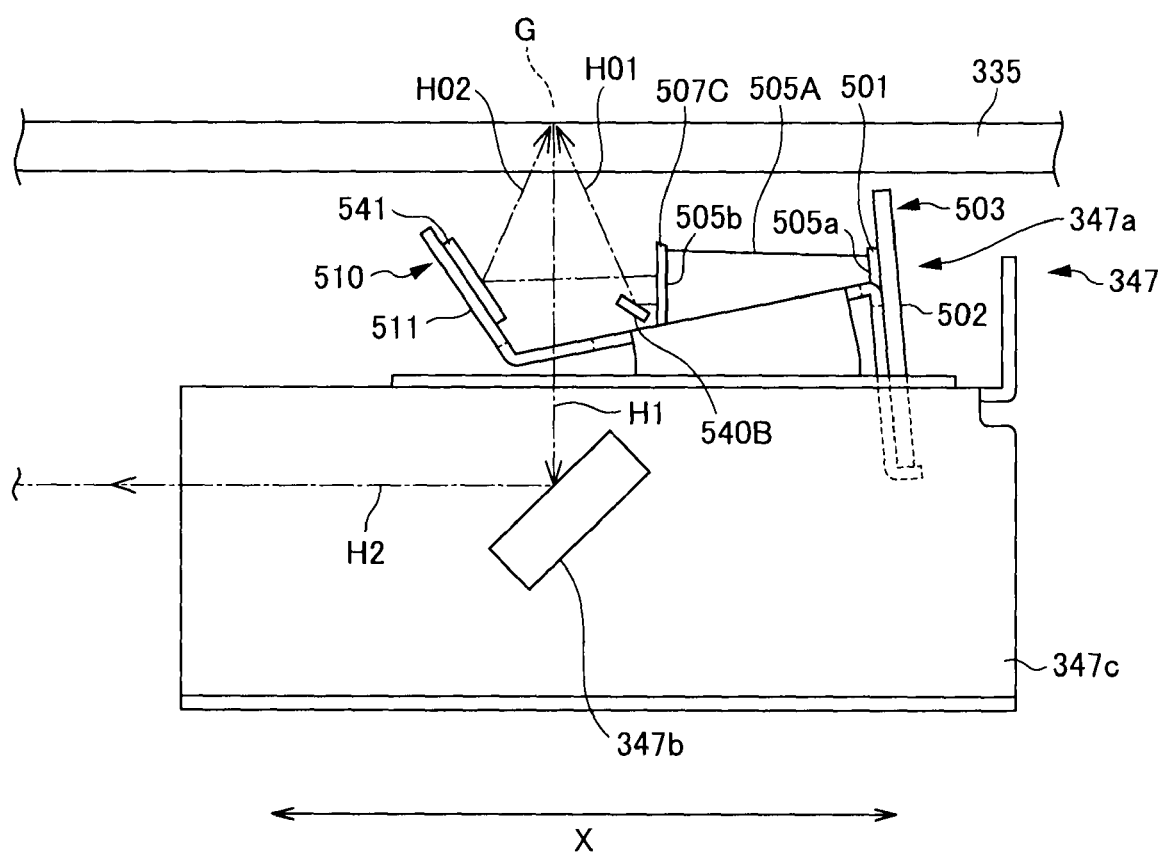
FIG. 9 is a diagram illustrating a case where a portion of the diffused light is split into a first diffused light H01 that is directly incident on an original G by means of a first reflection mirror 540B.

FIG. 9 is a diagram illustrating a case where a portion of the diffused light is split into a first diffused light H01 that is directly incident onto an original G by means of a first reflection mirror 540B.

As shown in FIG. 9, a light guiding body 505A is disposed so that a second end 505b, which is a light emitting side, faces the second reflection mirror 541. The portion of the diffused light that is emitted from the second end 505b and diffused by the elliptical diffuser plate 507C is directly incident upon the second reflection mirror 541. In other words, a portion of the diffused light is not split by a predetermined splitting portion (the first reflection mirror 540B, described later) and becomes the second diffused light H02.

The first reflection mirror 540B as the light splitting portion is disposed so as to be at a predetermined angle with respect to the elliptical diffuser plate 507C. The first reflection mirror 540B reflects a portion of the diffused light from the elliptical diffusion plate 507C toward the original G. In other words, a portion of the diffused light is reflected by the first reflection mirror 540B as the splitting portion and becomes the first diffused light H01.

Moreover, in the present embodiment, the elliptical diffuser plate 507 is attached to the light guiding body 505; however, the present invention is not limited thereto and, for example, the elliptical diffuser plate 507 may be attached directly to a high-rigidity attaching member that is configured integrally.

Figure 10A:
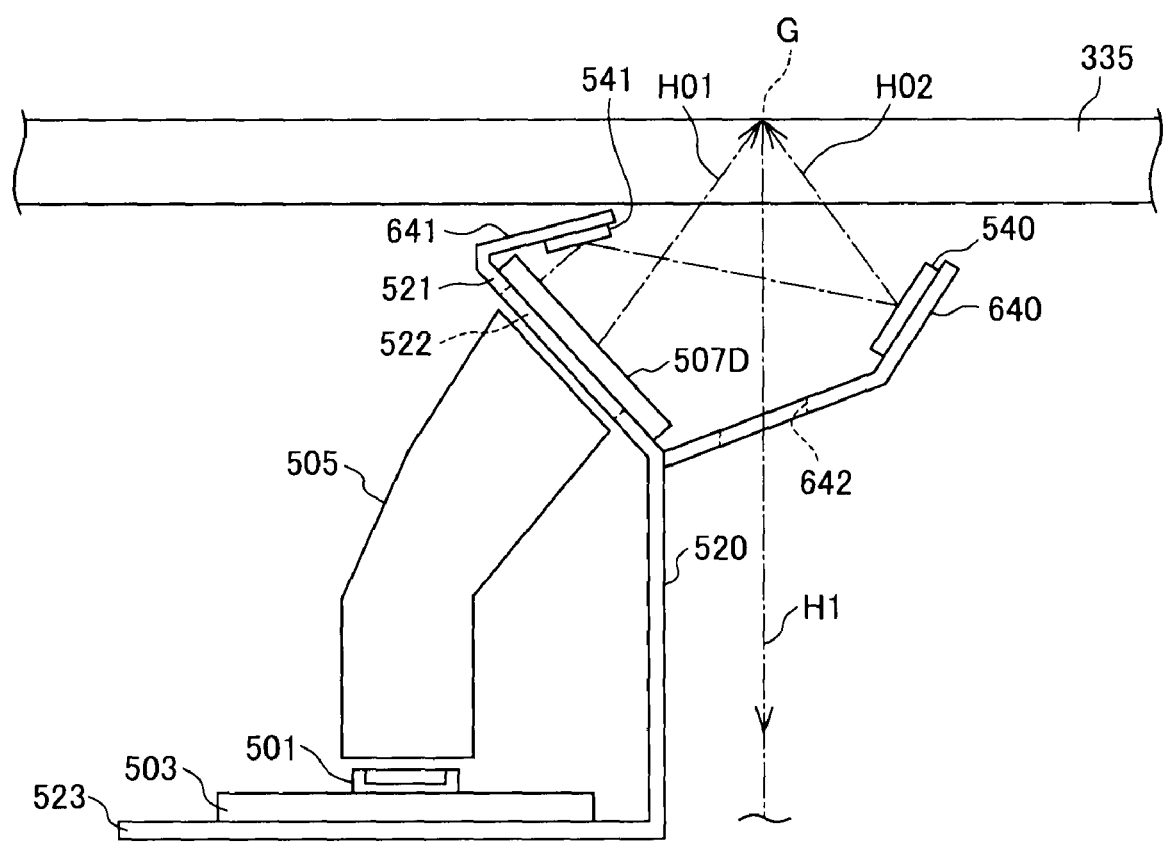
FIG. 10A is a diagram illustrating a state where an LED unit 503 and the elliptical diffuser plate 507D are attached to an attaching member 520.
Figure 10B:
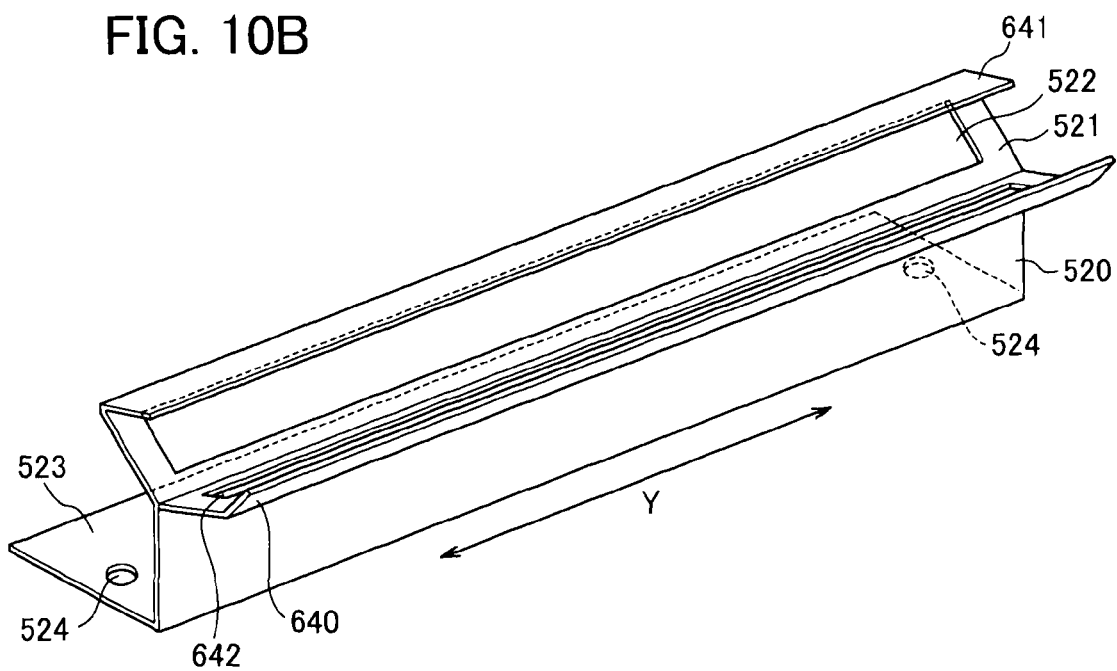
FIG. 10B is a perspective view of the attaching member 520.
Figure 10C:
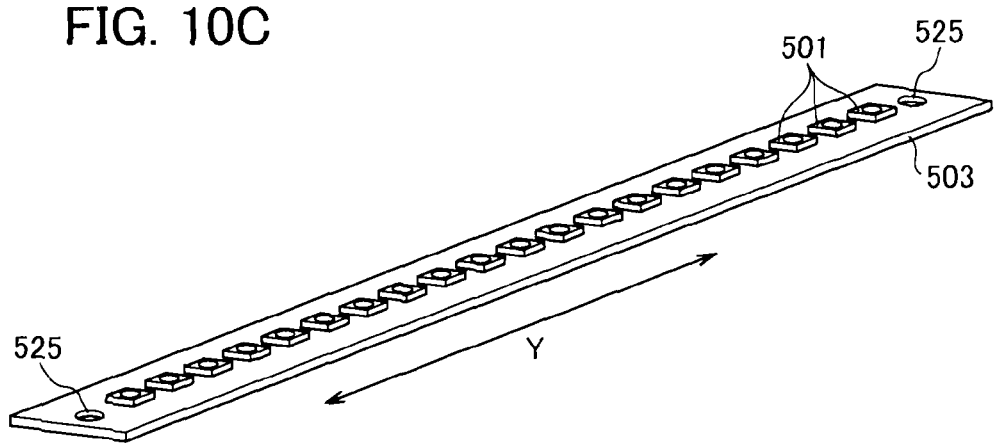
FIG. 10C is a perspective view of the LED unit 503 in which second fixing holes 525 and 525 are formed.

An attaching member 520 as another attaching member is described with reference to FIGS. 10A to 10C. FIG. 10A is a diagram showing a state where an LED unit 503 and the elliptical diffuser plate 507D are attached to an attaching member 520. FIG. 10B is a perspective view of the attaching member 520. FIG. 10C is a perspective view of the LED unit 503 in which second fixing holes 525 and 525 are formed.

As shown in FIGS. 10A to 10C, the attaching member 520, which includes: a first mounting portion 521 as the mounting portion, which is formed on a side to the original G and on which the elliptical diffuser plate 507 is mounted; an opening portion 522 formed in the first mounting portion 521 so as to extend in the main scanning direction Y; a first fixing portion 640 that is continuously formed in an end portion of the first mounting portion 521 in a lower side in a vertical direction and fixes the first reflection mirror 540; a slit portion 642 that is formed in the first fixing portion 640 and lets through the luminous flux H1 from the original G; a second fixing portion 641 that is continuously formed in an end portion of the first mounting portion 521 in an upper side in the vertical direction and fixes the second reflection mirror 541; a second mounting portion 523 on which the LED unit 503 is placed, which is disposed in parallel with the contact glass 335; and first fixing holes 524 and 524 that are formed in the second mounting portion 523 so as to position and fix the LED unit 503, may also be used as another attaching member.

The elliptical diffuser plate 507D is mounted on an original G side of the first mounting portion 521. The opening portion 522 formed in the first mounting portion 521 is formed so that light guided from the plurality of LEDs by the light guiding body 505, to be input to the elliptical diffuser plate 507D, can pass therethrough.

The first fixing portion 640 is continuously formed in an end portion of the first mounting portion 521 in a lower side in a vertical direction. The first reflection mirror 540 is fixed on the first fixing portion 640. The first fixing portion 640 is formed to extend vertically upward from a foot portion of the first mounting portion 521, so as to form a Y-shape with the first mounting portion 521. In addition, the slit portion 642 that lets through the luminous flux H1 is formed in the first fixing portion 640.

The second fixing portion 641 is continuously formed in an end portion of the first mounting portion 521 in an upper side in a vertical direction. The second reflection mirror 541 is fixed on the second fixing portion 641. The second fixing portion 641 is disposed so as to cover a portion of the elliptical diffuser plate 507D that is mounted on the first mounting portion 521.

The LED unit 503 is attached to the attaching member 520 in a state of being mounted on the second mounting portion 523. More specifically, the LED unit 503 is fixed by a fastening member (not shown) in a state where the second fixing holes 525 and 525 formed in the LED unit 503 align with the first fixing holes 524 and 524 formed in the second mounting portion 523.

As shown in FIG. 10A, by attaching the LED unit 503, the elliptical diffuser plate 507D, the first reflection mirror 540 and the second reflection mirror 541 on the high-rigidity attaching member 520, a positional relationship between the plurality of LEDs 501, the elliptical diffuser plate 507D, the first reflection mirror 540, and the second reflection mirror 541 can be maintained appropriately. More specifically, the plurality of LEDs 501 and the elliptical diffuser plate 507D are appropriately maintained in a positional relationship where the light from the plurality of LEDs 501 is substantially uniform in the main scanning direction. In addition, the first reflection mirror 540 and the second reflection mirror 541 are appropriately maintained in a positional relationship where a portion of the diffused light is incident upon a predetermined position on the original G as the second diffused light.

Next, a second embodiment of the present invention is described with reference to FIGS. 11 and 12.

Figure 11:
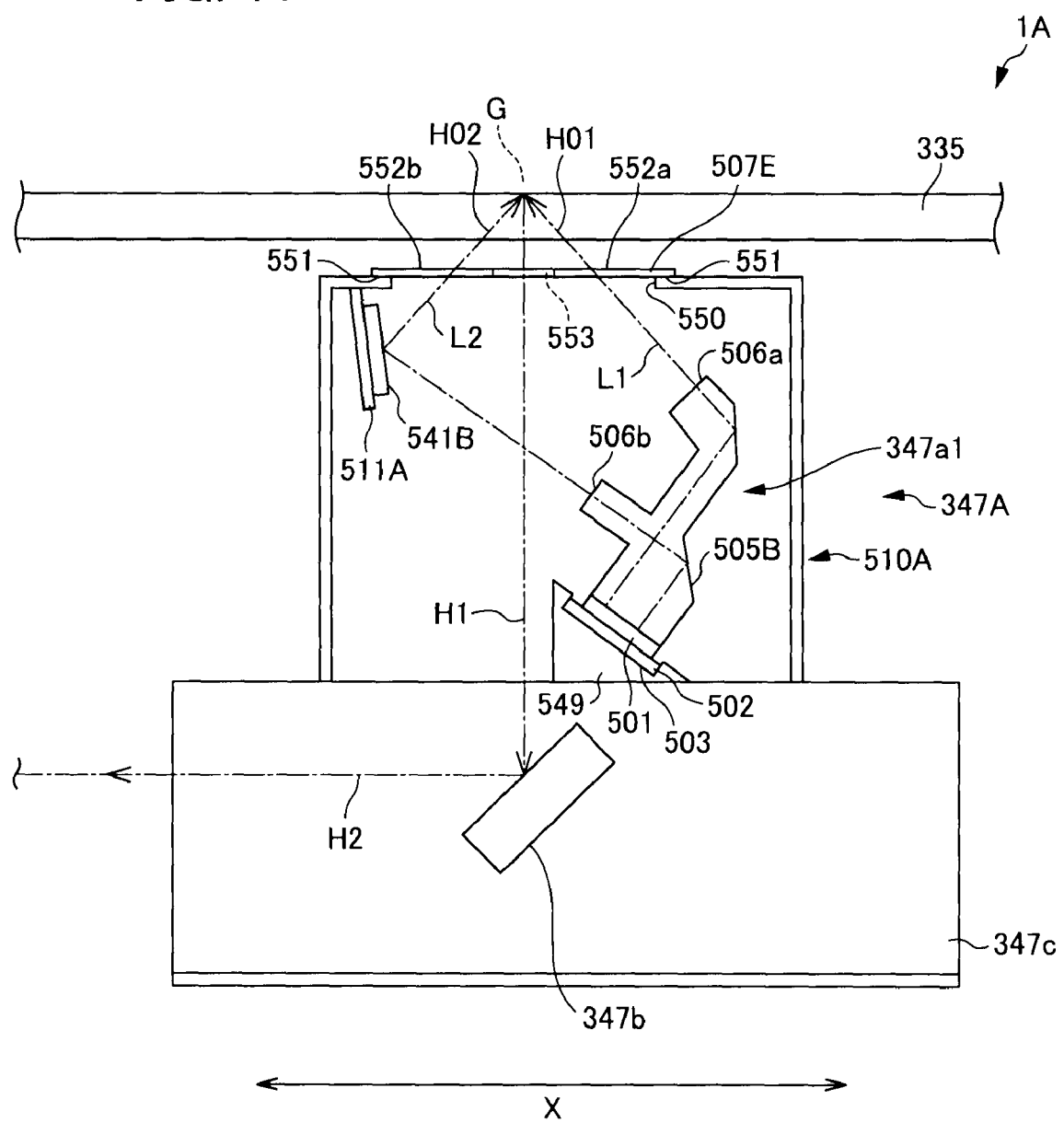
FIG. 11 is an enlarged view of an illumination unit 347A of a color copy machine 1A according to the second embodiment.

FIG. 11 is an enlarged view of an illumination unit 347A of a color copy machine 1A according to the second embodiment. FIG. 12 is a perspective view of an elliptical diffuser plate 507E.

Here, the color copy machine 1A according to the second embodiment has a similar configuration to that of the color copy machine 1 according to the first embodiment, except for the illumination unit 347A. Hereinafter, only the illumination unit 347A, which differs from the color copy machine 1, is described and descriptions of other components are omitted.

As shown in FIG. 11, the illumination portion 347a1 includes: an LED unit 503 to which a plurality of LEDs 501 is attached; the light guiding body 505B; the second reflection mirror 541B as the reflective portion that reflects second light L2 split by the light guiding body 505B; the elliptical diffuser plate 507E that diffuses first light L1 split by the light guiding body 505B and the second light L2 from the second reflection mirror 541B and irradiates the original G therewith; and an attaching member 510A to which the LED unit 503, the light guiding member 505B, the elliptical diffuser plate 507E, and the second reflection mirror 541B are attached.

As shown in FIG. 11, the light guiding body 505B has a first light emitting opening 506a and a second light emitting opening 506b. The first light L1 (the first diffused light H01) emitted from the first light emitting opening 506a is directly incident upon the original G. The second light L2 emitted from the second light emitting opening 506b is reflected by the second reflection mirror 541B and then incident upon the original G (as the second diffused light H02). In other words, the light guiding body 505B splits the light from the plurality of LEDs 501 into the first light L1, which is irradiated onto the original G and emitted from the first light emitting opening 506a, and the second light L2, which is directed toward the second reflection mirror 541B and emitted from the second light emitting opening 506b.

As shown in FIG. 11, the second reflection mirror 541B is mounted on a mirror mount 511A on the attaching member 510A. The second reflection mirror 541B reflects the second light L2 split by the light guiding body 505B and irradiates the original G therewith. More specifically, the second reflection mirror 541B reflects the second light L2, which is emitted from the second light emitting opening 506b of the light guiding body 505B, toward the original G. In other words, the second reflection mirror 541 reflects a portion of the light, which is emitted from the light guiding body 505B and not directly incident upon the original G, and irradiates the original G therewith.

Figure 12:
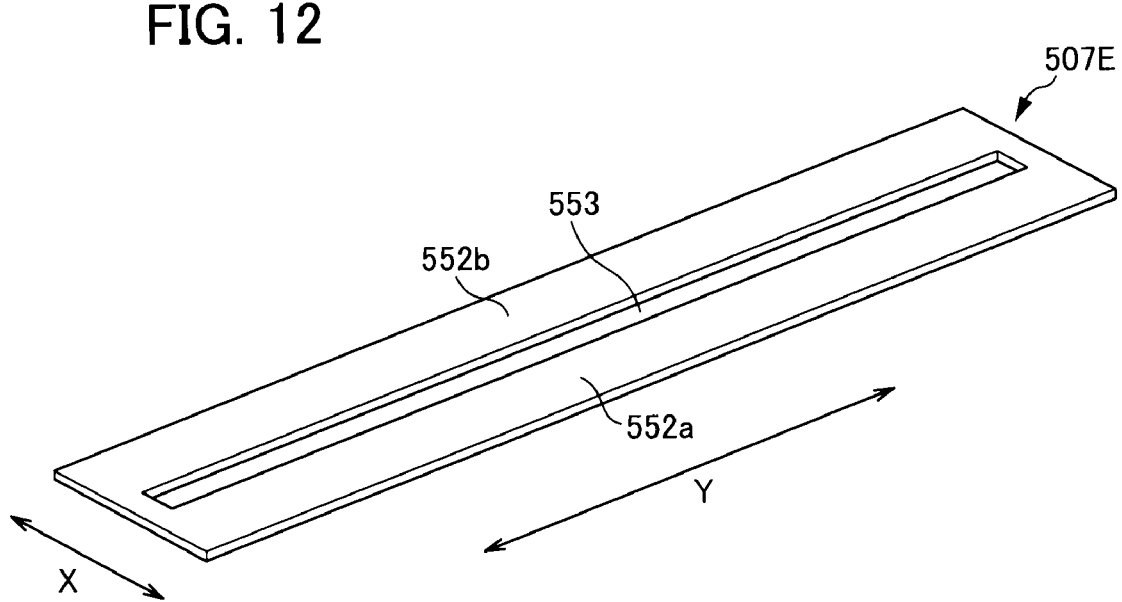
FIG. 12 is a perspective view of the elliptical diffuser plate 507E.

As shown in FIGS. 11 and 12, the elliptical diffuser plate 507E includes: a first diffuser portion 552a; a second diffuser portion 552b; and a slit portion 553 that is formed between the first diffuser portion 552a and the second diffuser portion 552b in the sub-scanning direction X and formed so as to extend in the main scanning direction Y.

The first light L1 is incident upon the first diffuser portion 552a. The first diffuser portion 552a diffuses the first light L1 and irradiates the original G with the light as the first diffused light H01. The second light L2 from the second reflection mirror 541B is incident upon the second diffuser portion 552b. The second diffuser portion 552b diffuses the second light L2 and irradiates the original G with the light as the second diffused light. The first diffused light H01 and the second diffused light H02 are incident upon the original G from the first side and the second side in the sub-scanning direction, respectively.

Here, according to the present embodiment, the first light L1 and the second light L2, which are split, are incident upon the elliptical diffuser plate 507E, diffused, and emitted. In the first embodiment, light that has already diffused is split by a predetermined splitting portion; however, the present embodiment is different therefrom in that light is first split and then diffused by the elliptical diffuser plate 507E.

The slit portion 553 is formed between the first diffuser portion 552a and the second diffuser portion 552b in the sub-scanning direction X. In addition, the slit portion 553 is formed to extend in the sub-scanning direction Y. The slit portion 553 is a portion through which the luminous flux H1 from the original G passes toward the first mirror 347b, without being diffused.

The LED unit 503, the light guiding body 505B, the elliptical diffuser plate 507E, and the second reflection mirror 541B are attached to the attaching member 510A. The LED unit 503 and the light guiding body 505B are positioned and fixed on a base portion 549.

The LED unit 503 and the light guiding body 505B are positioned and fixed such that the first light emitting opening 506a and the second light emitting opening 506b of the light guiding body 505B respectively face the original G and the second reflection mirror 541B.

The second reflection mirror 541B is fixed on the mirror mount 511A. The second reflection mirror 541B is fixed at an angle adjusted such that the second light L2 is incident upon a predetermined position on the original G.

The elliptical diffuser plate 507E is disposed so as to cover an upper face opening portion 550 as the opening that is formed on an upper face of the attaching member 510A. The elliptical diffuser plate 507E is disposed in a state where an outer edge thereof is supported by a diffuser plate supporting portion 551 that is formed at a periphery of the upper face opening portion 550.

Next, operations in the image reading device 300 according to the present embodiment are described hereinafter.

First, the original feeder portion 70 is made to be in an open state and the original G is placed on a second reading surface 304A (see FIG. 3) constituting the reading surface 302A. The illumination unit 347 and the mirror unit 349 are brought to the second position 304 as the optical sensor 362 (see FIG. 3) detects that the original G is placed on the second reading surface 304A.

Subsequently, the original feeder portion 70 is made to be in a closed state. When a start switch (not shown) is pressed, the color copy machine 1 is instructed to copy an image of the original G. When a start switch (not shown) is pressed, the image reading device 300 starts an operation of reading the image of the original G.

More specifically, first, the plurality of LEDs 501 (see FIG. 11) is turned on. Light from the plurality of LEDs 501 thus turned on is split into the first light L1 and the second light L2 by the light guiding body 505B. More specifically, the light from the plurality of LEDs 501 is split by the light guiding body 505B into the first light L1, which is emitted from the first light emitting opening 506*a*, and the second light L2, which is emitted from the second light emitting opening 506*b* (see FIG. 11).

The first light L1 is incident upon the first diffuser portion 552*a* of the elliptical diffuser plate 507E. The second light L2 is reflected by the second reflection mirror 541B toward the original G and incident upon the second diffuser portion 552*b* of the elliptical diffuser plate 507E. Subsequently, the first light L1 and the second light L2 are diffused and incident upon the original G as the first diffused light H01 and the second diffused light H02 (see FIG. 11).

Here, the light incident upon the elliptical diffuser plate 507 is diffused in the main scanning direction Y and not substantially diffused in the sub-scanning direction X. The first diffused light H01 is incident from a lower side in a vertical direction and the first side in the sub-scanning direction, and the second diffused light H02 is incident from a lower side in a vertical direction and the second side in the sub-scanning direction, upon the original G. The original G is irradiated with line-like light that extends in the main scanning direction Y.

As described above, the light irradiated onto the original G is adjusted to have a uniform intensity in the main scanning direction Y. In addition, since the light irradiated onto the original G is substantially not diffused in the sub-scanning direction X, the intensity of the light per unit area is greater than in a case where a conventional diffuser plate is used or where a diffuser plate is not used.

The illumination unit 347 and the mirror unit 349 are moved in the sub-scanning direction X while irradiating light onto the original G. The illumination unit 347 and the mirror unit 349 are moved while maintaining a length of the light path H constant.

A luminous flux from the original G is incident upon the imaging lens 357 after being reflected by the first mirror 347*b*, the second mirror 349*a*, and the third mirror 349*b* (see FIG. 3).

The imaging lens 357 forms an image of the original G. The CCD 358 disposed in the imaging position reads the image of the original G as image data, based on the image formed on the CCD 358 via the open window 360*a* of the guiding member 360 (see FIG. 3).

Here, since the light from the elliptical diffuser plate 507 is adjusted to have a uniform intensity in the main scanning direction Y, for example, even in a case where the specularly reflected light from the gloss black colored curled original G is incident on the CCD 358, the point-like flare images are not formed on the image being read.

In addition, since the light from the elliptical diffuser plate 507 is adjusted to have a uniform intensity in the main scanning direction Y, the image of the original G is read appropriately.

Furthermore, since the original G is irradiated with light from the first and the second sides in the sub-scanning direction X by splitting light from the elliptical diffuser plate 507, the generation of an edge shadow on an image being read can be suppressed.

The image information read by the CCD 358 is output to the CCD substrate 361. The image information being output to the CCD substrate 361 is then output to the device main body M via a predetermined circuit substrate.

The image information being input is input to an image forming control unit (not shown) in the device main body M. The image forming control unit controls the photoreceptor drum 2 as the image supporting body, the charging portion 10, the laser scanner unit 4, the developing unit 16 and the like constituting the image forming portion, based on the image information. A predetermined toner image is formed on the photoreceptor drum 2 based on the image information (see FIG. 1).

An image similar to the image of the original G is transferred to the paper T, which is conveyed to the transfer nip N formed by the photoreceptor drum 2, based on the image information. The paper T, on which the image is formed, is ejected from the ejecting portion 50 to the outside of the device main body M (see FIG. 1).

The present embodiment can provide the following effects, in addition to the effects of the first embodiment. According to the present embodiment, since the first mirror 540 or the like as the splitting portion in the first embodiment is not required, the number of components can be reduced.

In addition, according to the present embodiment, since light is split by the light guiding body 505B that is a single component, the accuracy of a light emitting angle and the like of the split light (L1 and L2) can be improved.

Here, in the present embodiment, the light from the plurality of LEDs 501 is split by the light guiding body 505B; however, the present invention is not limited thereto and can be configured, as in the first embodiment, such that a combination of the first reflection mirror 540 and the second reflection mirror 541 splits the light.

In addition, similarly to the first embodiment, the shape and the like of the attaching member 510A is not limited to that described in the present embodiment.

The first and the second embodiments have been described above as preferred embodiments of the present invention; however, the present invention is not limited thereto and can be carried out in various modes. For example, the copy machine 1 is exemplified in the present embodiment as an image forming device; however, the present invention is not limited thereto and can be a black and white copy machine, a printer, a facsimile machine and a multi-functional printer having functions thereof.

In addition, the image reading device 300 is formed to be integrated with the device main body M in the first and the second embodiments; however, the present invention is not limited thereto, and the image reading device can be configured with a housing other than the device main body M. For example, the image reading device 300 can be configured to be removable with respect to the device main body M.

Furthermore, although the image reading device 300 constitutes a portion of the color copy machine 1 as the image forming device in the first and the second embodiments, the present invention is not limited thereto, and the image reading device 200 can be a stand-alone device such as an image scanner.

Moreover, in the first and the second embodiments, the LED 501 is described as the illumination portion; however, the present invention is not limited thereto. For example, devices using organic EL (organic electro-luminescence) and optical fiber, and various lamps can also be used as the illumination portion.

In addition, in the first and the second embodiments, the illumination portions 347*a* and 347*a*1 have the light guiding body between the plurality of LEDs 501 and the elliptical diffuser plate; however, the present invention is not limited thereto, and can be configured so that the light from the plurality of LEDs 501 is directly incident upon the elliptical diffuser plate.

Furthermore, in the present embodiment, an example using an elliptical diffuser plate, which is adjusted so that a diffusion rate in a predetermined direction is high, as the diffuser plate is described; however, the present invention is not limited thereto and a diffuser plate and the like having the same diffusion rate in all directions may also be used.

What is claimed is:

1. An image reading device comprising:
an illumination portion, which irradiates light onto an original, including a plurality of luminescence portions disposed at predetermined intervals in a main scanning direction, a diffuser plate that is disposed between the original and the plurality of luminescence portions and causes the light emitted by the plurality of luminescence portions to diffuse, and a reflective portion that reflects light, which is a portion of the light diffused by the diffuser plate and not directly irradiated onto the original, so as to irradiate the light onto the original;
at least one mirror that forms a light path by reflecting a luminous flux from the original;
an imaging lens that forms an image from the luminous flux reflected by the at least one mirror; and
a reading portion that is disposed in an imaging position of the imaging lens, and reads an image of the original based on image formation by the imaging lens,
wherein the illumination portion further comprises a light splitting portion that is disposed between the diffusion plate and the original, and splits the light diffused by the diffusion plate into first diffused light that is directly irradiated onto the original and second diffused light that is irradiated onto the reflective portion.

2. The image reading device according to claim 1, wherein the illumination portion further comprises a light guiding body that is disposed between the plurality of luminescence portions and the diffuser plate.

3. The image reading device according to claim 1, wherein the light splitting portion is configured to include a reflective member that reflects a portion of the diffused light or a bending member that bends a portion of the diffused light.

4. The image reading device according to claim 1, wherein the diffuser plate is an elliptical diffuser plate that diffuses the light emitted by the plurality of luminescence portions at a higher diffusion rate in the main scanning direction than in a sub-scanning direction.

5. The image reading device according to claim 1, wherein the diffuser plate is disposed at a position at which a difference of intensity in the main scanning direction in light from the plurality of luminescence portions is smaller than in the vicinity of a light-emitting face of the plurality of luminescence portions.

6. The image reading device according to claim 5, wherein the diffuser plate is disposed at a position where the light from the plurality of luminescence portions is substantially uniform in the main scanning direction.

7. The image reading device according to claim 1, wherein each of the plurality of luminescence portions and the diffuser plate is attached to an attaching member that is integrally configured in a state maintaining a positional relationship where the light from the plurality of luminescence portions is substantially uniform in the main scanning direction.

8. An image reading device comprising:
an illumination portion, which irradiates light onto an original, including a plurality of luminescence portions disposed at predetermined intervals in a main scanning direction, a diffuser plate that is disposed between the original and the plurality of luminescence portions and causes the light emitted by the plurality of luminescence portions to diffuse, and a reflective portion that reflects light, which is a portion of the light diffused by the diffuser plate and not directly irradiated onto the original, so as to irradiate the light onto the original;
at least one mirror that forms a light path by reflecting a luminous flux from the original;
an imaging lens that forms an image from the luminous flux reflected by the at least one mirror; and
a reading portion that is disposed in an imaging position of the imaging lens, and reads an image of the original based on image formation by the imaging lens,
wherein each of the plurality of luminescence portions and the diffuser plate is attached to an attaching member that is integrally configured in a state maintaining a positional relationship where the light from the plurality of luminescence portions is substantially uniform in the main scanning direction;
wherein the attaching member has formed therein:
a mounting portion that is disposed on a side to the original, and mounts the diffuser plate; and
an opening portion that is formed on the mounting portion so as to extend in the main scanning direction, and passes light incident on the diffusing plate passes therethrough.

9. An image reading device comprising:
an illumination portion, which irradiates light onto an original, including a plurality of luminescence portions disposed at predetermined intervals in a main scanning direction, a reflective portion that reflects light, which is a portion of the light emitted by the plurality of luminescence portions and not directly irradiated onto the original, so as to irradiate the light onto the original, and a diffuser plate that is disposed between the plurality of luminescence portions and the original and between the reflective portion and the original, and causes light directly incident from the plurality of luminescence portions, which is a portion of light emitted from the plurality of luminescence portions, and light from the reflective portion, to diffuse;
at least one mirror that forms a light path by reflecting a luminous flux from the original;
an imaging lens that forms an image from the luminous flux reflected by the at least one mirror; and
a reading portion that is disposed in an imaging position of the imaging lens, and reads an image of the original based on image formation by the imaging lens,
wherein each of the plurality of luminescence portions and the diffuser plate is attached to an attaching member that is integrally configured in a state maintaining a positional relationship where the light from the plurality of luminescence portions is substantially uniform in the main scanning direction; and
wherein the attaching member has formed therein:
a mounting portion that is disposed on a side to the original, and mounts the diffuser plate; and
an opening portion that is formed on the mounting portion so as to extend in the main scanning direction, and passes light incident on the diffusing plate therethrough.

10. The image reading device according to claim 9, wherein the illumination portion further comprises a light guiding body that is disposed between the plurality of luminescence portions and the diffuser plate.

11. The image reading device according to claim 9, wherein the light guiding body includes a first light guiding portion that guides light from the plurality of luminescence portions to a side of the original and a second light guiding portion that guides the light to a side of the reflective portion.

12. The image reading device according to claim 9, wherein the diffuser plate comprises: a first diffuser portion upon which light from the plurality of luminescence portions is incident;
- a second diffuser portion upon which light from the reflective portion is incident; and
- a non-diffusing portion that is formed between the first diffuser portion and the second diffuser portion in the sub-scanning direction, and transmits a luminous flux from the original without diffusing.

13. The image reading device according to claim 9, wherein the diffuser plate is an elliptical diffuser plate that diffuses the light emitted by the plurality of luminescence portions at a higher diffusion rate in the main scanning direction than in a sub-scanning direction.

14. The image reading device according to claim 9, wherein the diffuser plate is disposed at a position at which a difference in light intensity in the main scanning direction of light from the plurality of luminescence portions is smaller than in the vicinity of a light-emitting face of the plurality of luminescence portions.

15. The image reading device according to claim 14, wherein the diffuser plate is disposed at a position where the light from the plurality of luminescence portions is substantially uniform in the main scanning direction.

16. An image forming device comprising:
an image reading device including:
an illumination portion, which irradiates light onto an original, including a plurality of luminescence portions disposed at predetermined intervals in a main scanning direction, a diffuser plate that is disposed between the original and the plurality of luminescence portions and causes the light emitted by the plurality of luminescence portions to diffuse, and a reflective portion that reflects light, which is a portion of the light diffused by the diffuser plate and not directly irradiated onto the original, so as to irradiate the light onto the original, at least one mirror that forms a light path by reflecting a luminous flux from the original, an imaging lens that forms an image from the luminous flux reflected by the at least one mirror, and a reading portion that is disposed in an imaging position of the imaging lens, and reads an image of the original based on image formation by the imaging lens;

an image supporting body on which an electrostatic latent image is formed on a surface thereof based on image information relating to an image of the original that is read by the image reading device;

a developing unit that develops a toner image on the electrostatic latent image formed on the image supporting body;

a transfer portion that directly or indirectly transfers the toner image formed on the image supporting body to a predetermined paper; and a fixing portion that fixes the toner image transferred to the predetermined paper by the transfer portion, wherein the illumination portion further comprises a light splitting portion that is disposed between the diffusion plate and the original, and splits the light diffused by the diffusion plate into first diffused light that is directly irradiated onto the original and second diffused light that is irradiated onto the reflective portion.

* * * * *